(12) United States Patent
Kaufmann et al.

(10) Patent No.: US 10,865,749 B2
(45) Date of Patent: Dec. 15, 2020

(54) FILTER AND FILTER CARTRIDGE

(71) Applicant: MANN+HUMMEL GmbH, Ludwigsburg (DE)

(72) Inventors: Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/427,177

(22) Filed: May 30, 2019

(65) Prior Publication Data
US 2019/0353122 A1    Nov. 21, 2019

Related U.S. Application Data

(63) Continuation of application No. 15/382,700, filed on Dec. 18, 2016, now Pat. No. 10,337,471, which is a
(Continued)

(30) Foreign Application Priority Data

| Jun. 18, 2014 | (DE) | .................. 20 2014 004 894 U |
| Jun. 18, 2014 | (DE) | .................. 20 2014 004 897 U |
| Nov. 11, 2014 | (DE) | .................. 20 2014 008 899 U |

(51) Int. Cl.
*F02M 35/024* (2006.01)
*B01D 46/00* (2006.01)
(Continued)

(52) U.S. Cl.
CPC ....... *F02M 35/02416* (2013.01); *B01D 45/16* (2013.01); *B01D 46/0005* (2013.01); *B01D 46/0023* (2013.01); *B01D 46/10* (2013.01); *B01D 46/4227* (2013.01); *B01D 46/522* (2013.01); *B01D 50/002* (2013.01); *F02M 35/0201* (2013.01); *F02M 35/024* (2013.01);
(Continued)

(58) Field of Classification Search
CPC ............ B01D 46/0005; B01D 46/0023; B01D 46/521; B01D 46/522; B01D 2271/022; B01D 2275/206; F02M 35/0216; F02M 35/02416; F02M 35/0245
See application file for complete search history.

(56) References Cited

U.S. PATENT DOCUMENTS

2010/0043366 A1    2/2010    Boehrs et al.

FOREIGN PATENT DOCUMENTS

| EP | 2106836 A1 * | 10/2009 | ............. B01D 46/10 |
| GB | 2092296 A | 8/1982 | |

* cited by examiner

*Primary Examiner* — Robert Clemente
(74) *Attorney, Agent, or Firm* — James Hasselbeck

(57) ABSTRACT

A filter cartridge for a filter for filtration of a fluid has a prismatic basic shape with a base face and a top face arranged parallel to each other and each having a polygonal basic shape. The prismatic basic shape is provided with a first lateral face and a second lateral face neighboring the first lateral face, wherein the first lateral face is an inflow surface and is substantially positioned perpendicular to the neighboring second lateral face. The prismatic basic shape has a third lateral face that is an outflow surface and is positioned at an angle relative to the first lateral face, wherein the angle is greater than 10° and smaller than 80°. A filter with such a filter cartridge is disclosed.

30 Claims, 43 Drawing Sheets

Related U.S. Application Data continuation of application No. PCT/EP2015/063537, filed on Jun. 17, 2015.

(51) Int. Cl.

| | | |
|---|---|---|
| *B01D 46/52* | (2006.01) | |
| *B01D 46/10* | (2006.01) | |
| *B01D 46/42* | (2006.01) | |
| *B01D 50/00* | (2006.01) | |
| *F02M 35/02* | (2006.01) | |
| *F02M 35/08* | (2006.01) | |
| *F02M 35/104* | (2006.01) | |
| *B01D 45/16* | (2006.01) | |

(52) U.S. Cl.
CPC .... *F02M 35/0216* (2013.01); *F02M 35/0245* (2013.01); *F02M 35/02475* (2013.01); *F02M 35/02491* (2013.01); *F02M 35/08* (2013.01); *F02M 35/104* (2013.01); *B01D 2271/022* (2013.01); *B01D 2271/027* (2013.01); *B01D 2275/206* (2013.01); *B01D 2279/30* (2013.01)

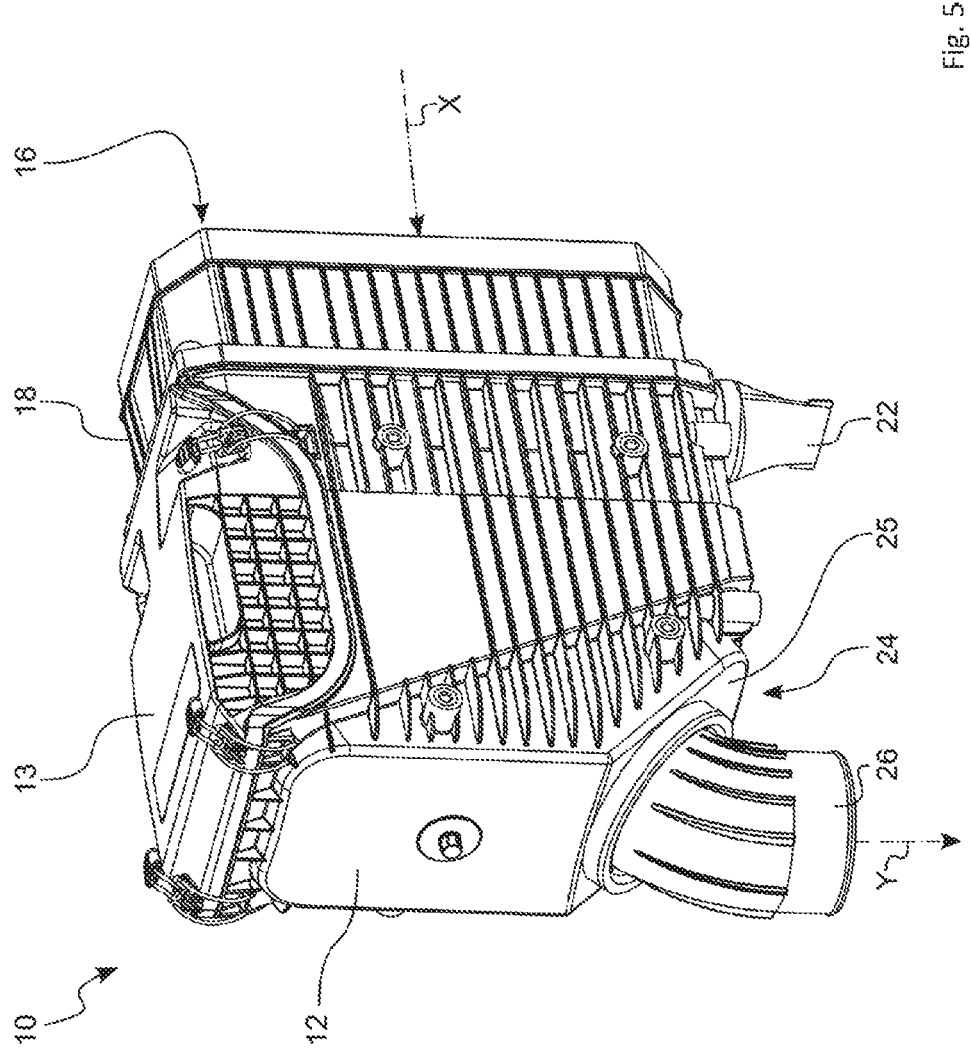

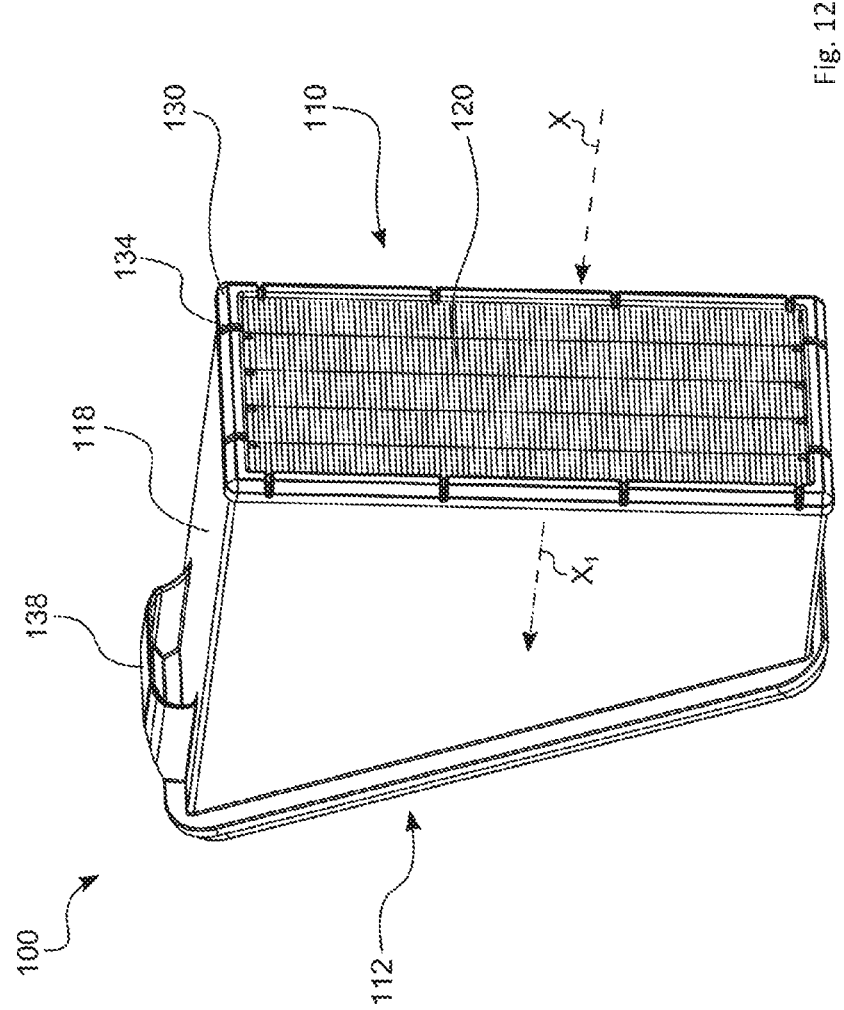

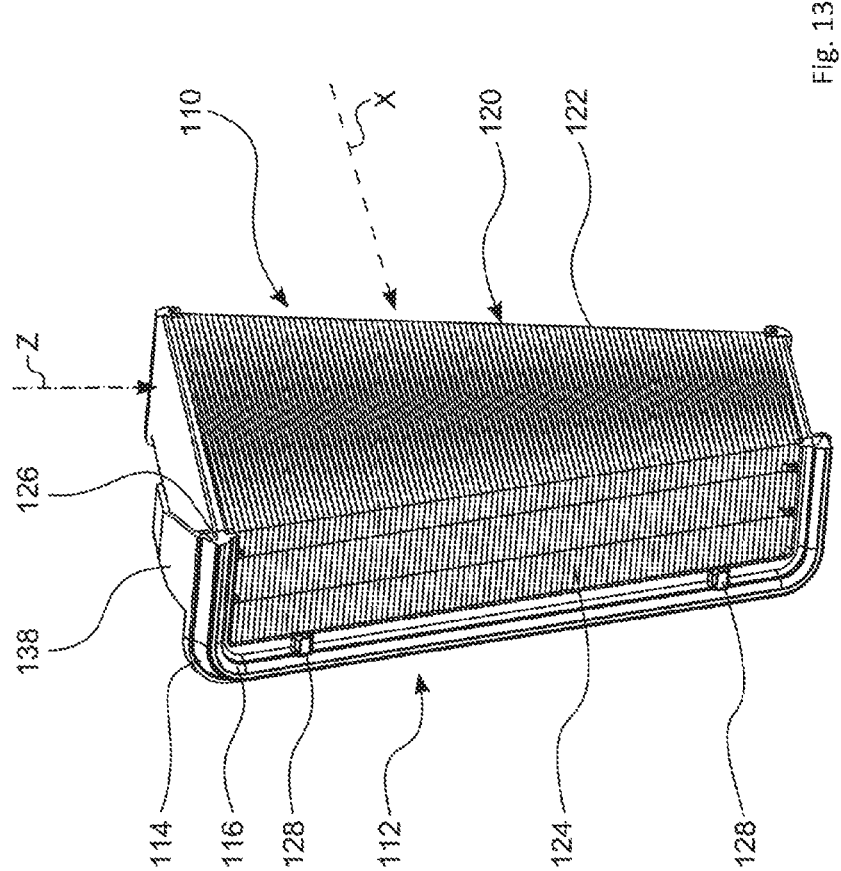

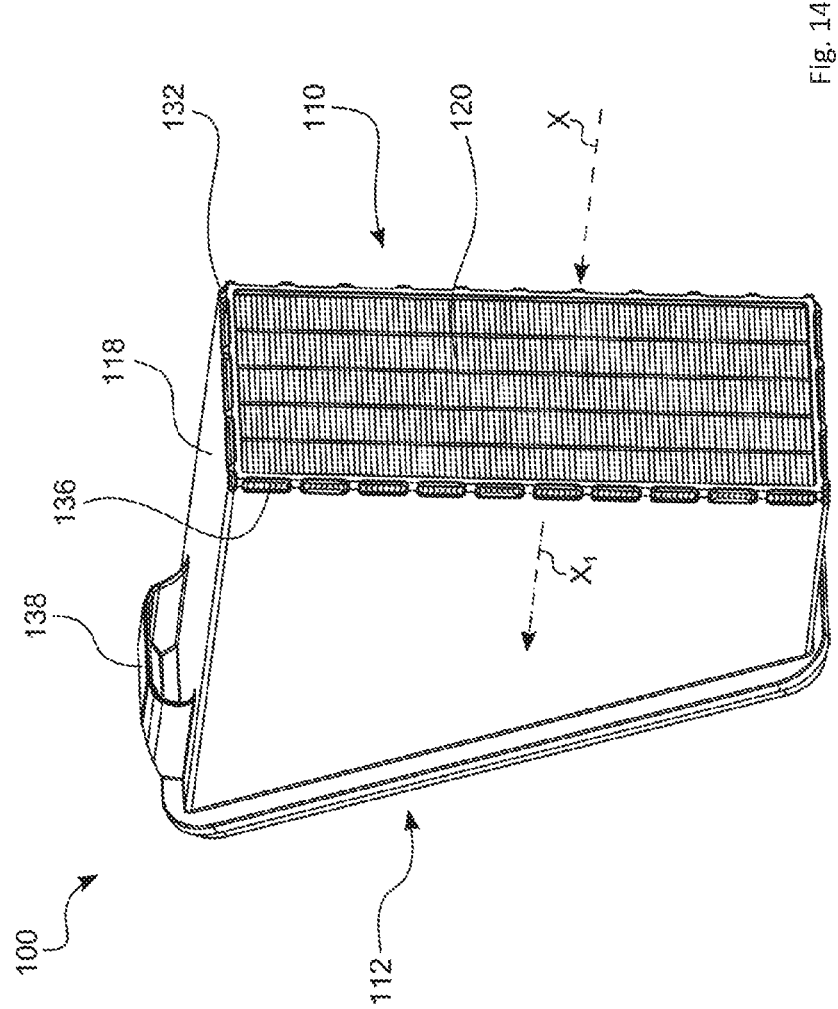

FILTER AND FILTER CARTRIDGE

CROSS-REFERENCE TO RELATED APPLICATIONS

This application is a continuation of U.S. patent application Ser. No. 15/382,700, filed 18 Dec. 2016, which is a continuation application of international application No. PCT/EP2015/063537 having an international filing date of 17 Jun. 2015 and designating the United States, the international application claiming a priority date of 18 Jun. 2014, based on two prior filed German patent applications Nos. 20 2014 004 897.5 and 20 2014 004 894.0, and a priority date of 11 Nov. 2014, based on prior filed German patent application No. 20 2014 008 899.3, the entire contents of the aforesaid international application and the aforesaid three German patent applications being incorporated herein by reference.

BACKGROUND OF THE INVENTION

The present invention concerns a filter, in particular for internal combustion engines, for filtering a fluid, in particular air, as well as a filter cartridge, in particular for such a filter.

In particular in construction and agricultural machines, engine air filtration is becoming more and more important. On the one hand, more and more efficient air filters are used because higher engine performances and stricter emissions standards require an increased air throughput through the engine. On the other hand, the number of component groups that are installed by default, such as air-conditioning devices, increases. This reduces the available installation space in the vehicle. Finally, there is the desire to design vehicles smaller and more lightweight which also is done at the expense of the available installation space.

For use in vehicles that provide little installation space for filtration purposes, in general so-called compact air filters or Z-filters with alternatingly closed channels that can be flowed though inline and that are formed by corrugated and flat layers of a filter medium positioned on top of each other are employed. This means that the inflow direction and the outflow direction extend parallel and substantially are aligned with each other. Often, the air which is flowing out of the air filter, depending on the application situation, must be deflected after having flowed through the filter. For this purpose, for example, a pipe elbow can be connected downstream to the filter housing. However, such downstream components increase again the required installation space of the entire arrangement.

It is an object of the invention to provide a filter, in particular for internal combustion engines, for filtering a fluid, in particular air, that requires less installation space for identical filter performance.

The aforementioned object is solved respectively by different aspects of the embodiments of a filter to be described in the following, in particular for internal combustion engines, for filtering a fluid, in particular air, as well as a filter cartridge, in particular for such a filter. As can be seen in the embodiments, the different aspects can be provided advantageously individually or combined in embodiments wherein, in case of combination, individual aspects enhance the advantages of other aspects and a synergistic interaction leads to an advantageous product.

SUMMARY OF THE INVENTION

This object is solved by a filter cartridge for a filter, in particular for internal combustion engines, for filtration of a fluid, in particular air, comprising a prismatic basic shape, wherein the parallel arranged base face and top face have a polygonal basic shape, comprising a first lateral face and a second lateral face neighboring the first lateral face, wherein the first lateral face is an inflow surface and is substantially positioned perpendicular to the neighboring second lateral face, and wherein a third lateral face that is an outflow surface and is positioned at an angle relative to the first lateral face that is greater than 10° and smaller than 80°.

This object is further solved by a filter comprising a filter cartridge according to the invention, wherein the main inflow direction of the filter and the main outflow direction of the filter are positioned at an angle of more than 30°, in particular more than 45°, preferably more than 60°, especially preferred 90°, relative to each other.

This object is further solved by a filter comprising a filter cartridge according to the invention, wherein the main inflow direction of the filter is parallel and displaced relative to the main outflow direction of the filter.

This object is further solved by a filter comprising a main filter cartridge and a secondary filter cartridge, wherein the main filter cartridge and/or the secondary filter cartridge are/is embodied in accordance with the invention.

Further embodiments of the invention are disclosed in the dependent claims.

The filter cartridge according to the invention comprises a prismatic basic shape wherein the parallel arranged base face and top face have a polygonal basic shape. The filter cartridge comprises in accordance with the polygonal basic shape of the base and top faces at least three, preferably four lateral faces. A first lateral face neighbors a second lateral face. The first lateral face as well as optionally also the second lateral face are inflow surfaces. Alternatively, the first lateral face and preferably additionally the second lateral face are outflow surfaces. The first lateral face and the second lateral face are positioned substantially perpendicular to each other. Substantially encompasses an angle range of 80° to 100°. A third lateral face is preferably positioned substantially opposite the first lateral face and is spaced apart therefrom in the flow direction and, in contrast to the first and the second lateral faces, is an outflow surface when the first and the second lateral faces are inflow surfaces or the third lateral face is an inflow surface when the first and preferably the second lateral faces are outflow surfaces. The third lateral face is positioned relative to the first lateral face at an angle that is smaller than 80° and greater than 10° and is in particular between 70° and 20°. Particularly preferred are angles such as 45° or 60°.

In the following, the aforementioned first alternative is described in which the first and optionally also the second lateral faces are inflow surfaces and the third lateral face an outflow surface. The explanations apply analogously to the reverse situation of the second alternative in which the first and the second lateral faces are outflow surfaces and the third lateral face an inflow surface. For the described filter cartridge geometry, in general one lateral face provides an inflow surface where the main fluid flow impacts first. The second lateral face that is optionally additionally used as an inflow surface assists entry of the fluid into the filter cartridge and increases the inflow surface. The fluid flows out through the third lateral face. Since the third lateral face is slantedly positioned relative to the first lateral face, for a filter with such a filter cartridge there is the possibility to determine the outflow direction already within the filter housing in the desired way. An external deflection outside of the filter housing, for example, by means of a curved outflow socket, is no longer necessary. Thus, two advantages are achieved. On the one hand, a significantly increased inflow surface results which possibly provides for better utilization of the filter capacity. At the same time, the filter geometry according to the invention permits a deflection of the main flow direction within the filter cartridge so that the installation space which is required by the filter is optimized, i.e., can be reduced.

The main flow direction is understood as the average direction of the flow at one position of the path through the filter system and/or filter element. For example, the main flow direction within a cyclone block comprised of a plurality of inline cyclone cells is defined by the axial extension of the cyclone cells. When impacting on the inflow surface of a filter element, the main flow direction is substantially perpendicular to this inflow surface and in other respects is defined by the path of least resistance which, passing through a filter element, is defined in case of a folded filter body by the course of the fold pockets between raw side and clean side and in case of a filter body with alternatingly closed channels by the extension of the channels.

According to one embodiment, the polygonal basic shape is a triangle, preferably a quadrangle or a pentagon. The resulting prismatic basic shape, depending on the application situation, can also have slightly curved lateral faces. Also, inflow or outflow can be realized through the base face and/or top face of the prism.

Preferably, the polygonal basic shape is a quadrangle wherein, further preferred, a fourth lateral face is provided which is positioned preferably opposite and parallel to the second lateral face. In this context, it is particularly preferred that the second and fourth lateral faces as well as the base and top faces are oriented perpendicular to the first lateral face. Further preferred, base face and top face are oriented perpendicular to the third lateral face.

The first lateral face is preferably the only inflow surface. The third lateral face is preferably the only outflow surface.

A preferred further embodiment of the invention provides that the filter cartridge comprises a filter body with a zigzag-shaped folded filter medium. Such a folded filter medium comprises a large surface area and can be brought relatively inexpensively into the desired basic shape.

One embodiment provides that the folds have outer fold edges, which are positioned on the first lateral face or define the latter, and inner fold edges (i.e., positioned at the clean side) that are positioned opposite the outer fold edges and positioned on the third lateral face or define the latter. Accordingly, inflow into the filter cartridge is substantially realized perpendicular to the fold edges. The same holds true for the outflow wherein the third lateral face is positioned slantedly relative to the first lateral face.

In the described zigzag-shaped folding of the filter medium, the folds have at least one, in general two, end face(s) which are formed by the zigzag-shape extension of the edges of the folded filter medium and either are located on the second (and fourth) lateral face or on the base face and top face of the prismatic filter body. Accordingly, inflow of the filter medium is realized through the fold edge and optionally also through the end face of the fold. The end faces in this case must be designed such that no direct inflow to the clean side of the filter cartridge can take place, for example, by one-sided adhesive connection at the clean side.

A particularly preferred embodiment of the invention provides that the depth of neighboring fold edges or folds differs and in particular every other fold has the same depth. The different depths of neighboring fold edges enables a slanted configuration of the filter cartridge and, in this way, the embodiment of the desired geometry.

A particularly preferred further embodiment provides in this context that the depth of neighboring folds is different, in particular such that the fold heights at the second and fourth lateral faces are different wherein the fold height between second and fourth lateral faces changes continuously, in particular linearly.

A particularly preferred embodiment of the invention provides that the folds each have two end faces. One end face of the folds is positioned on the second lateral face. The other end face of the folds is positioned on a fourth lateral face. The second lateral face is larger than the fourth lateral face. The fourth lateral face comprises more fold edges than the second lateral face, in particular twice as many. By doubling the fold edges on the fourth lateral face, it is possible to produce or adjust the angle between the third lateral face and the first lateral face.

An alternatively preferred embodiment of the invention provides that the folds each have two end faces. One end face of the folds is positioned on the base face and another end face on the top face. Base face and top face are preferably congruent. In this context, the second and fourth lateral faces are preferably each formed by the first or last fold of a fold bellows. Preferably, the fold heights on the second and fourth lateral faces are different wherein the fold height between second and fourth lateral faces changes continuously, in particular linearly. In this way, it is possible to produce and adjust the angle between the third lateral face and the first lateral face. Preferably, a right angle is formed, respectively, between the first lateral face, which is further preferred the inflow surface, and the second as well as the fourth lateral faces. As an alternative to the described fold arrangement, a layered configuration of alternating flat and corrugated layers can be also used and between them channels are formed that can be alternatingly closed off by means of adhesive. The angle which is formed between first and third lateral faces can be realized in this context by layering of layers of different lengths wherein the layer length between second and fourth lateral faces changes (dis-)continuously, in particular linearly.

The concept of the invention is also realized in a filter with a filter cartridge according to the invention. In such a filter it can be provided that the main inflow direction of the filter and the main outflow direction of the filter are positioned relative to each other at an angle of more than 30°, in particular more than 45°, preferably more than 60°, and especially 90°. The main outflow direction is understood as the average direction of the flow between outflow surface of the main filter element and inflow surface of the secondary filter element, if present, or the outflow opening out of the filter housing.

Alternatively, it can be provided that the main inflow direction of the filter is parallel and displaced relative to the main outflow direction of the filter. As a result of the slanted position, realized by the filter cartridge, of the outflow surface of the filter cartridge relative to the inflow surface of the filter cartridge, within the filter a deflection of the main inflow direction toward the main outflow direction can be realized such that the main outflow direction is positioned at an angle relative to the main inflow direction or is displaced by a certain length. This can be realized simply and inexpensively by appropriate outflow openings at the filter.

Another also advantageous further development of the invention provides a filter with a primary filter element according to the invention and a secondary filter element according to the invention. By configuring the primary and secondary filter cartridges with a prismatic basic shape, a particularly great freedom of deflection of the fluid flows in such a filter is created.

In a preferred embodiment, the filter cartridge, in the area of the outflow surface, comprises a seal for separating a filter interior in clean side and raw side and a spacer structure for determining a spacing between the filter cartridge frame and a filter cartridge that can be positioned downstream, in particular a secondary filter cartridge. By means of the spacer structure, a prior determined spacing between filter cartridge, that can be, for example, a main filter cartridge, and a downstream further filter cartridge, that is, for example, a secondary filter cartridge, can be maintained even under extreme conditions of use, for example, vibrations. This ensures that the further filter cartridge cannot move out of its designated position and thereby lose its sealing function and securing function.

In one embodiment of the invention it is provided that the spacer structure is arranged within the seal, in particular at several locations along the seal, and in particular at the circumference of the outflow surface. For such a configuration it can be provided that the outer circumference perpendicular to the main flow direction of the further filter cartridge follows in shape and size the seal and therefore provides a support surface for the spacer structure.

An advantageous embodiment of the invention provides that the normals of the outflow surface or/and of a sealing surface of the seal are positioned relative to the main flow direction, in particular the main flow direction within the filter cartridge, at an angle between 5° and 45°, in particular an angle of 24°±10° and in particular an angle of 24°±5°. In the regularly occurring situation of an inflow surface that is positioned perpendicular to the main flow direction (or first lateral face) this means that the outflow surface (or third lateral face) is slanted by the aforementioned angle relative to the inflow surface. An outflow surface which is angled in such a way to the main flow direction has a larger surface area compared to an outflow surface that is not angled. Generally, the angled positioning of the outflow surface or/and of the sealing surface provides the possibility of effecting a deflection of the main flow direction already within the filter cartridge or directly downstream of the filter cartridge. This saves installation space and improves the pressure loss within the filter as a result of shorter flow distances.

Advantageously, the spacer structure is formed integrally with the seal, in particular is molded with the seal. This enables, for example, the use of the same material and manufacture of the spacer structure in the same processing step used for the seal.

A particularly preferred embodiment provides that the spacer structure is designed to exert in the installed state of the filter cartridge a clamping or holding force on a further filter cartridge which can be arranged downstream in the main flow direction, in particular a secondary filter cartridge, wherein the force presses the further filter cartridge into its installation position. This can be achieved, for example, in that the spacer structure is made of an elastic material. When the filter cartridge is then inserted after the further filter cartridge, already the insertion can exert a force on the further filter cartridge by suitable selection of an appropriate geometry. This improves, in turn, the reliability of the filter because the further filter cartridge is permanently exposed to a force which keeps it in its designated position.

In a preferred embodiment of the invention, the seal acts axially in the direction of the main flow direction. This means that the force which is to be applied for the sealing action is extending parallel to the outflow direction.

In an embodiment of the invention, the filter body is embodied as a filter bellows, in particular with variable fold height. By means of the variable fold height, for example, an outflow surface that is extending at a slant to the main flow direction can be realized. A configuration of a zigzag-shaped folded filter body is understood as variable fold height when the fold heights across a length of the folded bellows defined by the sequence of fold edges is not constant but changes continuously or discontinuously or differs in neighboring sections. Preferably, the height of the folds changes continuously, and further preferred linearly, across the length of the bellows.

In an advantageous embodiment, a secondary filter cartridge can be arranged downstream of the main filter cartridge. The filter cartridge frame of the main filter cartridge or the main filter cartridge has preferably in the area of the outflow surface a seal for separating the filter housing in clean side and raw side as well as a spacer structure for determining a spacing between the filter cartridge frame and the secondary filter cartridge.

In an advantageous embodiment of the filter, it is provided that the filter housing has an insertion direction which is substantially perpendicular to the main flow direction, in particular the main flow direction within the main filter cartridge. This enables after insertion of the secondary filter cartridge an insertion of the main filter cartridge in such a way that the secondary filter cartridge is blocked against moving out of its designated seat.

In a preferred embodiment, it is provided that the secondary filter cartridge comprises a seal for contacting the filter housing wherein the seal is in particular designed to be radially acting relative to the flow direction of the secondary filter cartridge. It is thus not required to provide a sealing surface on the filter housing in axial extension of the main flow direction of the secondary filter cartridge. Instead, already upon insertion into the designated seat, the seal is effective perpendicular to the main flow direction against the filter housing.

According to an embodiment of the invention, the secondary filter cartridge comprises a secondary filter body and a secondary filter cartridge frame supporting the secondary filter body. In this context, it can be provided that, in the inserted state of the main filter cartridge and of the secondary filter cartridge, the spacer structure of the main filter cartridge contacts the seal or the secondary filter cartridge frame of the secondary filter cartridge. Accordingly, vibrations that occur in situations of use cannot cause the secondary filter cartridge to move out because the spacer structure of the main filter cartridge blocks the space through which the secondary filter cartridge has been inserted.

The filter cartridge according to the invention comprises preferably in the area of the inflow surface an edge protection that is extending externally about the filter frame and/or about the inflow surface and/or the first lateral face. The edge protection connects the filter body and the filter cartridge frame with each other or the edge protection is resting inwardly on the filter cartridge frame, in particular with form fit. According to the invention, this provides thus a synergistic interaction of edge protection and of the connection of the filter body with the filter cartridge frame. This is particularly advantageous in the usual practice in field of construction machines where filter cartridges are cleaned by blowing out or tapping.

In particular, in particularly preferred embodiments it is provided that the edge protection forms a seal-tight connection for the filtered fluid between filter body and filter cartridge frame, in particular, by form-fit embedding of filter body and filter cartridge frame by means of conventional potting compounds used in the field of filtration, such as polyurethane. Accordingly, the connection of filter body and filter cartridge frame forms at the same time the sealing action of the filter body relative to the filter cartridge frame.

In an inventive further embodiment of the invention, it is provided that the filter cartridge frame in the area of the edge protection has cutouts that are filled out by the edge protection. This enables a particularly good mechanical connection between the edge protection and the filter cartridge frame.

Particularly preferred, the cutouts extend perpendicular to the main flow direction. It is thus not required to provide in the filter cartridge frame an angled member for the edge protection. Instead, the edge protection can be placed completely about the inflow-side edges of the filter cartridge frame and, at the same time, can penetrate the filter cartridge frame through the cutouts and, in this way, provide a particularly stable mechanical connection.

In a further embodiment of the invention, the filter cartridge frame surrounds the filter body. In addition, the filter cartridge frame determines the main flow direction of the filter cartridge.

A particularly preferred embodiment of the invention provides that the edge protection partially penetrates the filter body. In this way, after hardening of the edge protection, a particularly stable connection is provided between the edge protection and the filter cartridge frame, on the one hand, and the filter cartridge frame and the filter body, on the other hand.

A particularly preferred embodiment of the invention provides that the connection between filter body and filter cartridge frame is an adhesive connection which is formed as one part together with the edge protection. In particular, the adhesive connection and the edge protection can be formed of the same material, in particular of a polyurethane. This enables technical advantages in particular during manufacture because the adhesive connection between the filter cartridge frame and the filter body, the sealing action between filter body and filter cartridge frame, and the edge protection can be produced in one processing step and a particularly robust embodiment is created at the same time.

In one embodiment, the filter cartridge and/or the filter body comprises an outer shape embodied as a truncated wedge.

A further embodiment of the invention provides that the filter body is embodied as a filter bellows, in particular with variable fold height. The variable fold height enables an angled positioning between the outflow surface and the main flow direction.

According to the invention, the edge protection is designed such that, when tapping the filter cartridge, the resulting forces can be at least partially absorbed by the edge protection and in particular damage of the filter cartridge can be prevented.

The filter according to the invention, in particular for internal combustion engines, for filtering a fluid, in particular air, comprises a filter housing with a raw-side area and a clean-side area. A main filter element is insertable into the filter housing and comprises a main filter element inflow surface, a main filter element flow direction, a main filter element outflow surface as well as a seal arranged on a sealing surface. For example, the main filter element can have a prismatic basic shape. In particular, a flow through the lateral faces can be realized. The seal serves for fluid-tight separation of the raw-side area of the filter housing from the clean-side area of the filter housing. Moreover, the filter optionally comprises a secondary filter element arranged downstream of the main filter element and provided with a secondary filter element inflow surface, a secondary filter element flow direction, and a secondary filter element outflow surface. The sealing surface is positioned at a slant to the main flow direction of the main filter element. The slanted sealing surface makes available within the filter housing downstream of the main filter element a space in which, on the one hand, the secondary filter element can be arranged. At the same time, due to the sealing surface positioned at a slant relative to the main flow direction, a deflection of the main flow direction is already realized in the filter housing. Accordingly, with a suitable arrangement of an outflow opening on the filter housing, a deflection of the fluid flow in the desired direction can be realized. It is thus possible to eliminate the otherwise required pipe elbow or the like downstream of the housing.

The sealing surface and the main flow direction can be positioned in particular at an angle that is between 85° and 10°. Within this angle range, a noticeable deflection of the fluid flow occurs.

One embodiment of the invention provides that the sealing surface is curved and in particular is positioned on a lateral cylinder surface. By means of a concave configuration of the sealing surface, viewed from the main filter element, the installation space available for the main filter element can be optimized and provides sufficient space for a secondary element with a suitable selection of the radius of curvature. At the same time, due to the curvature of the sealing surface, the outflow direction of the filter housing, depending on the position of the outflow opening, can be determined in a particularly simple way. Preferably, the axis of the cylinder of the lateral cylinder surface is perpendicular to the main filter element flow direction and perpendicular to the secondary filter element flow direction.

Alternatively, the sealing surface can be positioned in a plane.

A preferred embodiment of the invention provides that the sealing surface and the main filter element outflow surface extend parallel. In this way, a clearly defined separation plane between the raw side and the clean side of the filter housing is provided. At the same time, for a curved embodiment of the sealing surface, an installation space-optimized configuration of the filter interior and thus of the entire filter is provided.

Preferably, it is provided that the secondary element inflow surface is extending parallel and spaced-apart relative to the sealing surface. In this way, it is ensured that upon change of the secondary filter element the clean side of the filter housing does not become soiled. In a curved configuration of the sealing surface, a secondary element inflow surface is provided that is also curved.

In a preferred embodiment of the invention, the basic shape of the secondary filter element is a parallelepiped. This enables a simple construction of the secondary element, for example, from a flat element with straight folds in which the fold edges at the inflow side and outflow side each form planes that are preferably positioned parallel to each other at a spacing defined by the fold height.

Alternatively, the basic shape of the secondary element can be a prism with one or several curved lateral faces such as, for example, a hollow lateral cylinder sector. This can be realized, for example, by a curved flat bellows. This shape provides the possibility of adapting the secondary filter element to a curved main filter element outflow surface and to thereby further optimize the installation space.

In a preferred embodiment of the invention, the basic shape of the main filter element is a prism. In particular, the base face and the top face of the prism can be a quadrangle or a pentagon. The quadrangle or the pentagon can have two or three right angles, an acute and an obtuse angle. A preferred embodiment of the invention provides that a lateral face of the prism, viewed from the exterior, is convexly curved so that a main filter element outflow surface results which is embodied as a lateral cylinder surface, for example.

An advantageous embodiment of the invention provides that the main filter element is a folded bellows with at least two different fold depths. By means of two different fold depths, the main filter element outflow surface that is slanted relative to the main flow direction of the main filter element can be realized at the fold end faces. Alternatively, by a continuously increasing fold height the main filter element outflow surface that is slanted relative to the outflow direction of the main filter element can be realized at the fold edges. The terms fold depth and fold height are synonymously used herein.

An advantageous embodiment of the invention provides that the filter housing has an inflow direction, an outflow direction, as well as an outflow area with an outflow opening. An outflow socket can be attached to the outflow area wherein the outflow area comprises a fastening surface for the outflow socket and the fastening surface is positioned at an angle of 45° relative to the main filter element flow direction. The fastening surface which is slanted by 45° relative to the main flow direction is located particularly preferred in an arrangement on the filter housing in such a way that it is positioned, viewed in the main filter element flow direction, within the filter housing, i.e., it does not project past it. At the same time, this fastening surface, viewed in a direction perpendicular to the main flow direction of the main filter element, i.e., for example, in an insertion direction of the main filter element, is located below the main filter element. In summarizing, an arrangement results in which the main filter element and/or the secondary element in the main flow direction, in particular in main flow direction of the filter element, project past the outflow opening of the filter housing at least partially, preferably completely. An outflow socket which is mounted on this fastening surface can now distribute the outflowing filtered fluid comparatively easily in any directions.

A particularly preferred embodiment of the invention provides that the outflow socket is formed such that within the outflow socket a deflection of the flow direction by 45° results. This means that the outflow socket preferably is designed as a 45° elbow. In this way, only the orientation of the outflow socket on the outflow area, in particular on the fastening surface, is relevant with respect to the final outflow direction. This enables in a particularly advantageous way the determination of the outflow direction of the filtered fluid with a single component, i.e., the outflow socket. The final outflow direction of the filter housing results by suitable orientation of the outflow socket on the fastening surface.

A preferred further embodiment of the invention provides that the outflow socket comprises a rotation-symmetrically embodied fastening area for attachment on the fastening surface of the filter housing. Accordingly, by rotation of the outflow socket the final determination of the outflow direction of the entire filter housing can be determined. In this way, an angle range between 0° and 90° results between the inflow direction of the filter housing and the outflow direction of the filter housing with one and the same components.

In the same way, it may be determined that the outflow direction out of the outflow socket and the fastening surface are positioned at an angle of 45° relative to each other.

An alternative further embodiment of the concept of the invention provides that the fastening surface is positioned on a lateral cylinder surface. The axis of the cylinder is positioned in this context preferably perpendicular to the main flow direction of the main filter element. Such a curved fastening surface is preferably combined with a correspondingly curved fastening area of an outflow socket. The position of the outflow socket at the outflow area then determines the outflow direction of the filter housing.

Preferably, the fastening surface and the secondary element outflow surface extend parallel. This enables an extremely high integration and thus installation space optimization.

According to the invention, in an embodiment it can be provided that the main filter element is insertable and removable along an insertion axis into the filter housing wherein the insertion axis is positioned relative to the main flow direction at an angle between 90° and the angle at which the sealing surface and the main flow direction are positioned relative to each other, preferably however 90°. According to this embodiment, the filter housing has a cover that is designed such that, in the state in which it closes off the filter housing, it exerts a force on the main filter element in the direction of the sealing surface. This can be realized, for example, by blades that project from the cover, laterally relative to the main filter element, into the filter housing and that in particular are wedge-shaped and that have on their narrow side a support surface, respectively. The blades are supported preferably with a first support surface on the filter housing and are positioned with a second support surface that is opposite the first support surface on a contact surface of the main filter element or of its support frame and force in this way the seal of the main filter element against the sealing surface of the housing. Preferably, the support surfaces of the blades are positioned relative to each other at an angle which corresponds to the angle between inflow surface and outflow or sealing surface (or between first and second lateral faces). Due to the slanted position of the sealing surface, the force which is exerted on the cover is at least partially converted into an axial force in the sealing direction, i.e., into a force which is partially acting in the direction of the main flow direction and preferably perpendicular to the sealing surface and/or outflow surface. This provides a force which presses the main filter element with its seal mounted on the sealing surface against a main filter element seat on the filter housing.

The secondary filter cartridge is designed to be inserted downstream of the main filter cartridge into a filter. It has an inflow side, an outflow side, and an outflow direction. Moreover, the secondary filter cartridge comprises a filter body which can be flowed through along the outflow direction and preferably a filter cartridge frame supporting the filter body. The filter cartridge frame further comprises preferably a seal for separating a filter interior of the filter into clean side and raw side as well as, further preferred, an adhesive connection between the filter body and the filter cartridge frame. The separate configuration of seal and adhesive connection enables a substantially more stable configuration of the adhesive connection and is of independent inventive importance. In a preferred embodiment of the invention, the seal is designed to be acting radially to the main flow direction and is extending in particular substantially perpendicular to the main flow direction about the secondary filter cartridge. The seal can comprise a cellular rubber.

Particularly preferred, it is provided that a support section of the filter cartridge frame is extending circumferentially about the filter body and the support section comprises on the inner side an inner edge, in particular a groove, for receiving an adhesive material of the adhesive connection. This enables a mechanically particularly stable connection between the filter body and the filter cartridge frame. In particular, it can be provided that the depth of the groove extends in the direction of the main flow direction.

In a further embodiment of the invention, a seal receiving section of the filter cartridge frame is extending circumferentially externally about the filter body. In particular when removing and installing the secondary filter cartridge, shearing forces acting on the seal are absorbed by the seal receiving section.

One embodiment provides that the adhesive connection comprises a polyurethane and in particular is foamed. In particular, the adhesive connection can penetrate the filter body partially and, in this way, can ensure a particularly strong adhesive connection between filter body and filter cartridge frame.

In a further embodiment of the invention, it can be provided that the filter cartridge frame comprises at the outflow side a grate that is covering the outflow surface. This increases the collapse resistance of the secondary filter cartridge at high differential pressures. In particular, the grate can be formed as one part together with the filter cartridge frame.

The secondary filter cartridge has preferably an inflow-side grip area. The grip area in this context is designed preferably such that an inflow into the filter body via the grip area and a manual removal of the filter cartridge are possible. This is of independent inventive importance. In this way, the area is enlarged by means of which inflow into the filter body is realized. Since in general there is anyway a possibility for handling the filter cartridge, in particular for installation and removal of the filter cartridge, the pressure drop or pressure loss caused by the filter cartridge is significantly reduced by designing the grip area so as to be flowed through by the fluid to be filtered.

In a preferred further embodiment of the invention, it is proposed that laterally to the main inflow surface an auxiliary inflow surface is provided. This provides for the generally improved inflow situation of the filter cartridge with a further inflow surface of the filter cartridge and reduces thus further the pressure loss caused by the filter cartridge. In this context, it can be particularly provided that the grip area enables inflow into the filter body laterally adjacent to the main inflow surface.

Preferably, the grip area is designed as a grip depression and the grip depression is facing toward the filter body. On the one hand, the grip depression provides a particularly simple possibility for removing the filter cartridge from its inserted position. On the other hand, the shape of a depression enables a particularly turbulence-free inflow of the fluid to the filter body, in particular to the main inflow surface and the auxiliary inflow surface.

In one embodiment of the invention, it is provided that in main flow direction the grip area is substantially not projecting past the inflow surface. Also, the filter body can be substantially of a parallelepipedal shape.

In a further configuration, the filter body is configured as zigzag-shaped folded filter bellows and in particular one of the end faces of the filter bellows folds (i.e., the side faces which are formed by the zigzag-shaped course of the folded filter medium) face in the direction of the grip area. Due to the configuration according to the invention of the grip area that is open toward this end face, the flowing fluid is guided to the end faces of the filter bellows folds. In case of a one-sided sealing action of the end faces only at the clean side of the folded filter medium, the end face partially remains open at the raw-side unglued gaps between the folds. In this way, the fluid can flow at the end face into the interior of the filter bellows without bypassing the filter body. In this way, in addition to the regular main inflow surface which is formed by the fold edges, the end face of the filter bellows can serve as an auxiliary inflow surface and can thus minimize the pressure loss.

In a particularly preferred embodiment of the invention, the filter cartridge is designed as a secondary filter cartridge. Since in particular the installation space which is downstream of the main filter cartridge is particularly tight not always allows for an inflow surface at the secondary filter cartridge to be realized to be equivalent to the total outflow surface of the main filter cartridge, an additional auxiliary inflow surface is of particularly great importance for optimizing the entire filter system.

In a further inventive embodiment of the invention, it is provided that the filter cartridge frame at the outflow side is provided with a grate covering the outflow surface. In particular at high pressure differentials or when changing the main filter element in operation, a particularly high collapse pressure of a secondary filter cartridge is important. This is decisively improved by providing an outflow-side grate.

The grate can be preferably formed as one part together with the filter cartridge frame.

As an alternative to the one-part embodiment of the afore described filter cartridge, it is also possible that the filter cartridge frame is separable from the (main) filter cartridge and thus can be reused upon exchange of the filter cartridge. For this purpose, preferably a reusable filter cartridge frame is provided which can receive the main filter cartridge. This is referred to in the following as a two-part solution.

In this solution, it is preferably provided that the seal is arranged on the filter cartridge and is connected thereto in a non-detachable way. The seal has in this context preferably substantially a pointed shape in cross-section which ends in the preferred flattened sealing surface which can be axially pressed seal-tightly against a sealing contact surface of the filter housing. Further, the seal and the sealing surface are preferably located in this context outside of, in particular radially outside of, the filter body envelope which is defined in particular by the base and top faces as well as the second and the fourth lateral faces.

In a preferred further embodiment of the two-part solution, for reinforcement and better mechanical support of the seal on the filter frame on the end of the filter cartridge frame which is facing the seal, a seal holder is provided which comprises preferably an I-shaped or L-shaped cross-section, wherein the first web is projecting away from the filter cartridge frame outwardly and provides a seal support surface that is extending parallel to the sealing surface and on which the seal with its support surface, positioned opposite the sealing surface and surrounding the filter body circumferentially at least partially, can be supported.

The seal support surface represents in this context the I-shaped cross-section or the first leg of the L-shaped cross section. Optionally, for configuring the second leg of the L, a second web is provided which is extending away from the filter cartridge frame and surrounds the seal externally In all embodiments, the seal can contact the filter body or preferably penetrate it so that a fluid-tight, in particular form-fit, sealing action between filter body and the seal is realized.

The main filter cartridge of the two-part solution comprises at its inflow side preferably an edge protection that is extending externally about the filter body. The edge protection is preferably designed such that upon tapping of the main filter cartridge, for example, for cleaning it, impacts against the filter cartridge can be absorbed and at least partially compensated. Accordingly, damage of the filter cartridge, for example, of the filter body, can be avoided. The edge protection extends, further preferred, about the inflow-side edge of the filter element.

On the inflow-side edge of the edge protection of the two-part solution, on the longitudinal sides (the edges toward the base and top face) at least one cutout (preferably two) is provided, respectively, in which support webs of the filter cartridge frame can engage particularly by form fit, in particular for stabilization of the filter cartridge frame and/or for a positional securing action of the filter cartridge. The edge protection of the two-part solution has moreover, in particular positioned in the installation direction (Z direction) between the cutouts, on the longitudinal sides, a laterally outwardly projecting projection which project past the exterior surface of the filter body, in particular the base and top faces. The projections upon insertion of the filter cartridge into the filter cartridge frame of the two-part solution can be guided in a groove which is extending in the insertion direction. The groove moreover comprises preferably, viewed in the insertion direction, shortly before the inflow-side end, i.e., spaced a few millimeter or centimeters away from the inflow-side edge of the filter cartridge frame, an elevation which is reducing the depth of the groove and is in particular so high that in the area of the elevation the groove completely or partially vanishes and toward the inflow-side end of the filter cartridge frame forms again an inflow-side end area. The projections and/or the elevation are preferably designed such that, when inserting of the filter cartridge into the filter cartridge frame, the elevation must be overcome, in particular with elastic deformation of the filter cartridge, in particular of the projections, before the projections, further preferred, come to rest in the inflow-side end area of the groove. Accordingly, a detachable, form-fit connection of the filter cartridge with the filter cartridge frame can be produced. Alternatively, it is also conceivable to position the elevation at the end of the insertion path so that the filter cartridge by means of the clamped projections is secured in its end position by friction.

BRIEF DESCRIPTION OF THE DRAWINGS

The invention will now be explained in more detail with reference to the drawings. The terms filter cartridge and filter element are synonymously used.

FIG. 5 is a perspective external view of the filter of FIG. 1 according to the invention.

FIG. 12 is a perspective rear view of the main filter cartridge of FIG. 11.

FIG. 13 is a perspective section view of the main filter cartridge of FIG. 11.

FIG. 13a is a perspective section view of the main filter cartridge of FIG. 11a.

FIG. 13b is a perspective section view of the support frame of the main filter cartridge of FIG. 11a.

FIG. 14 is a perspective rear view of the main filter cartridge of FIG. 11 without edge protection.

The embodiments described in connection with the above Figures represent detailed embodiments and further developments of the embodiments described with the aid of FIGS. 20 to 36 wherein the features that have been added as a result of the further development are advantageous but not mandatorily required and can also be added individually to an embodiment according to the following illustrated Figures.

Figure 20:
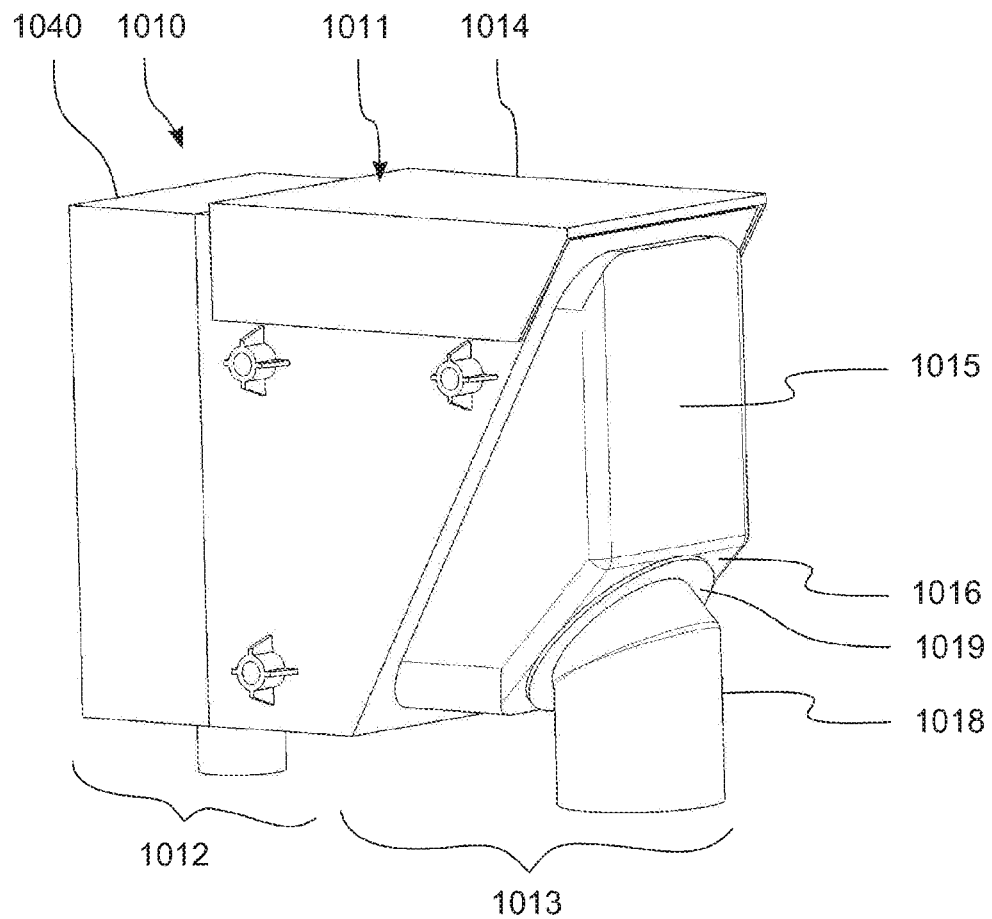

FIG. 20 is a perspective front view of the filter.

Figure 21:
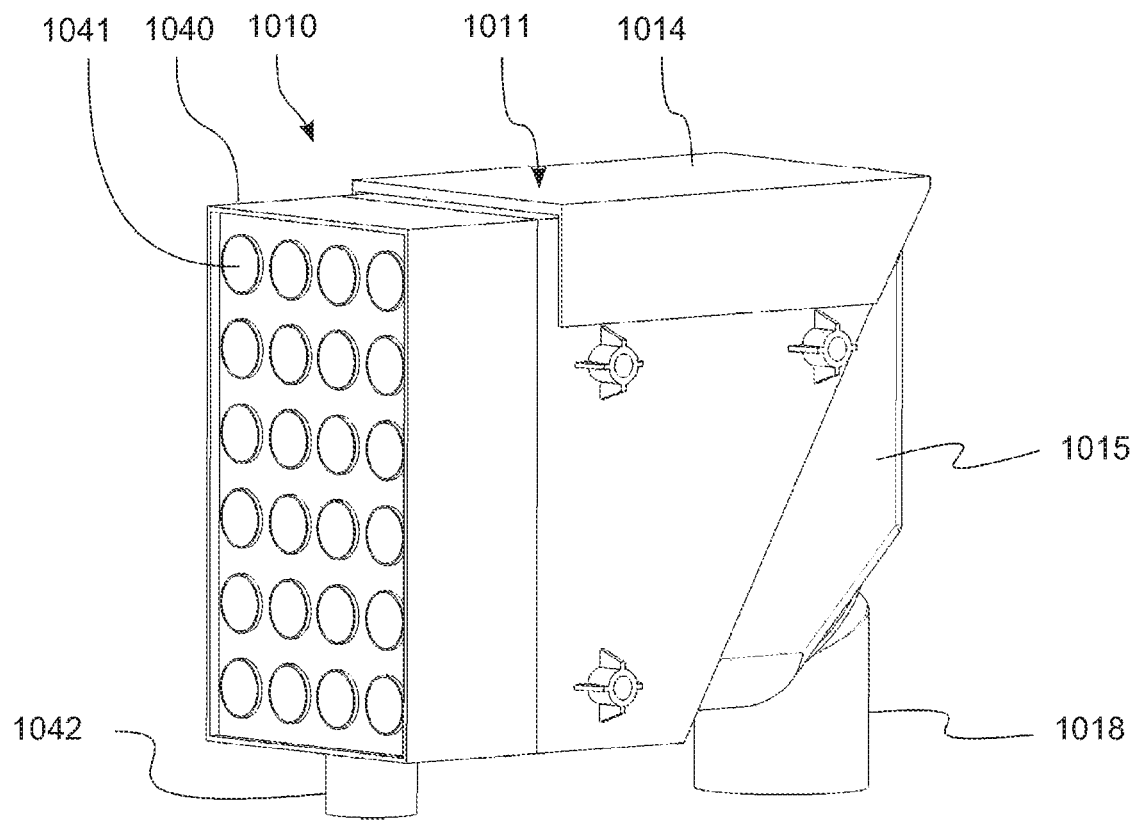

FIG. 21 is a perspective rear view of the filter of FIG. 20.

Figure 22:
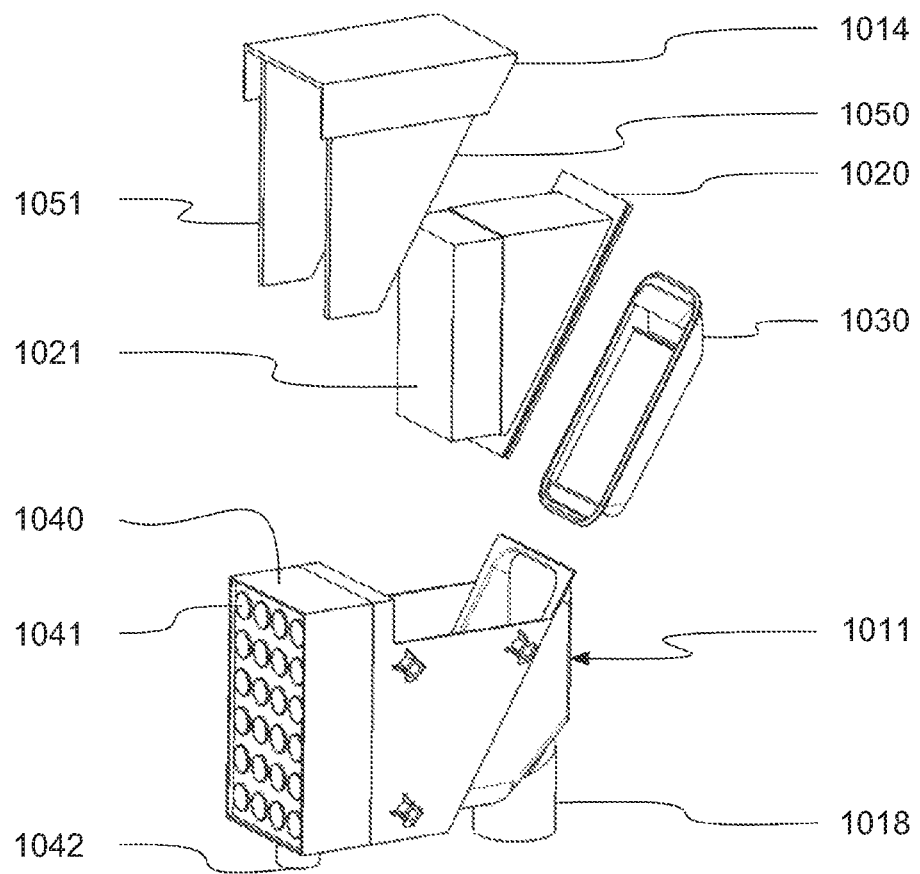

FIG. 22 is an exploded view of the filter of FIG. 20.

Figure 23:
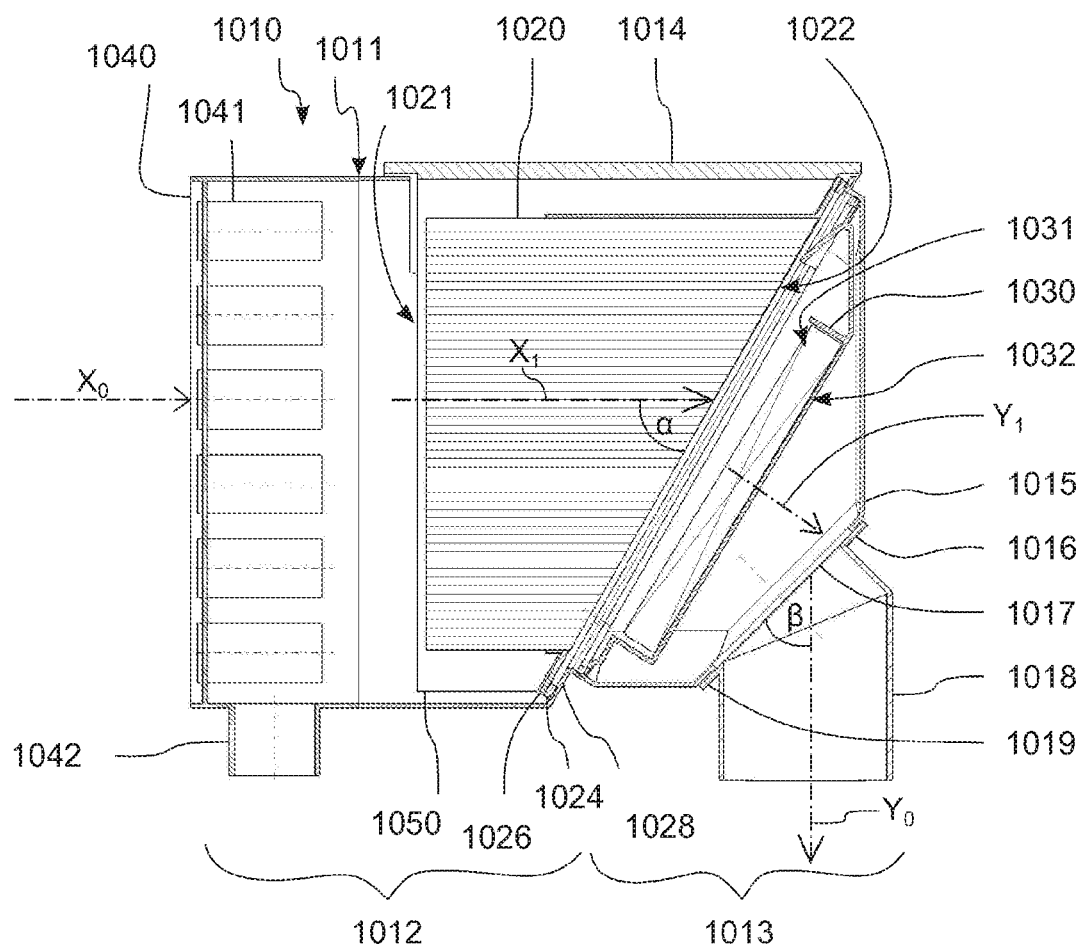

FIG. 23 is a section illustration of the filter according to the invention.

Figure 24:
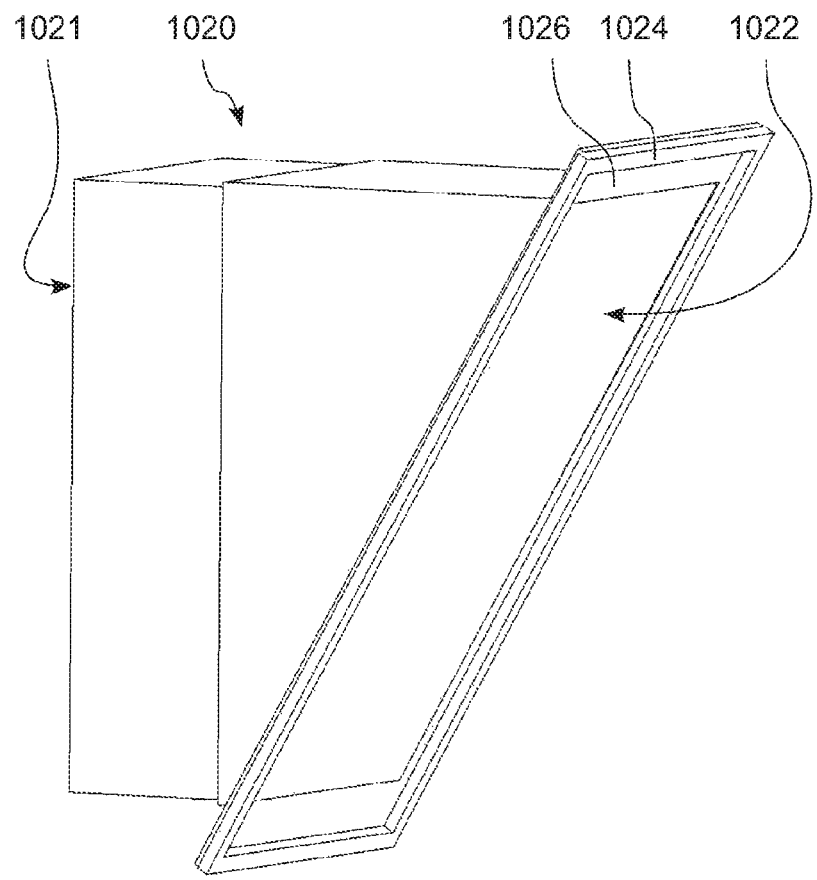

FIG. 24 is a front view of the main filter element according to the invention.

Figure 25:
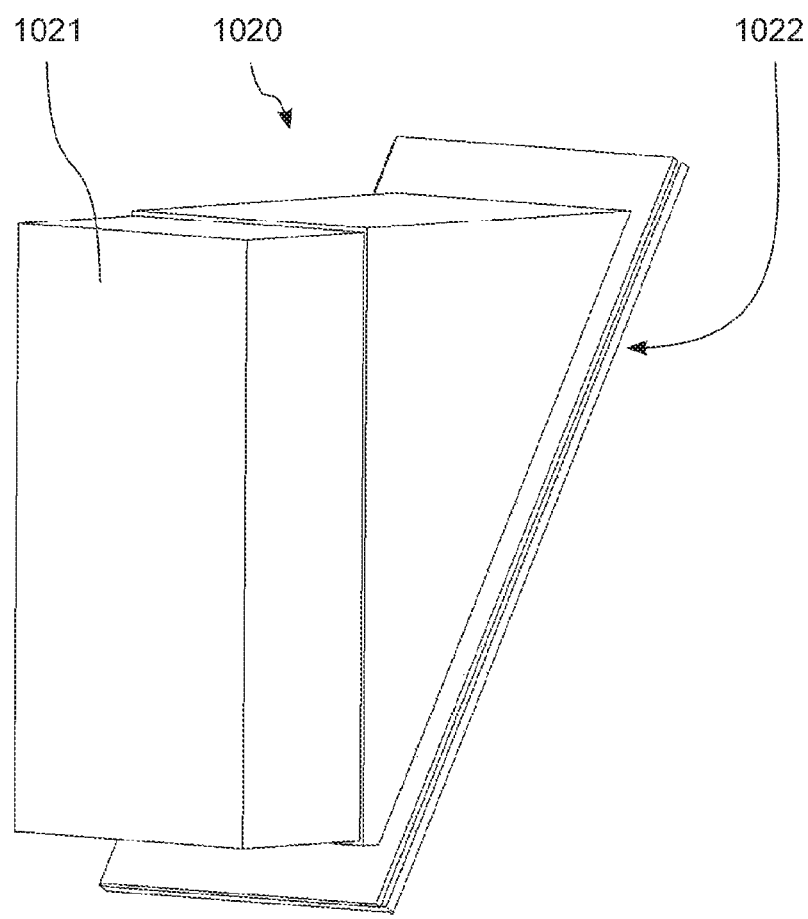

FIG. 25 is a rear view of the main filter element according to the invention.

Figure 26:
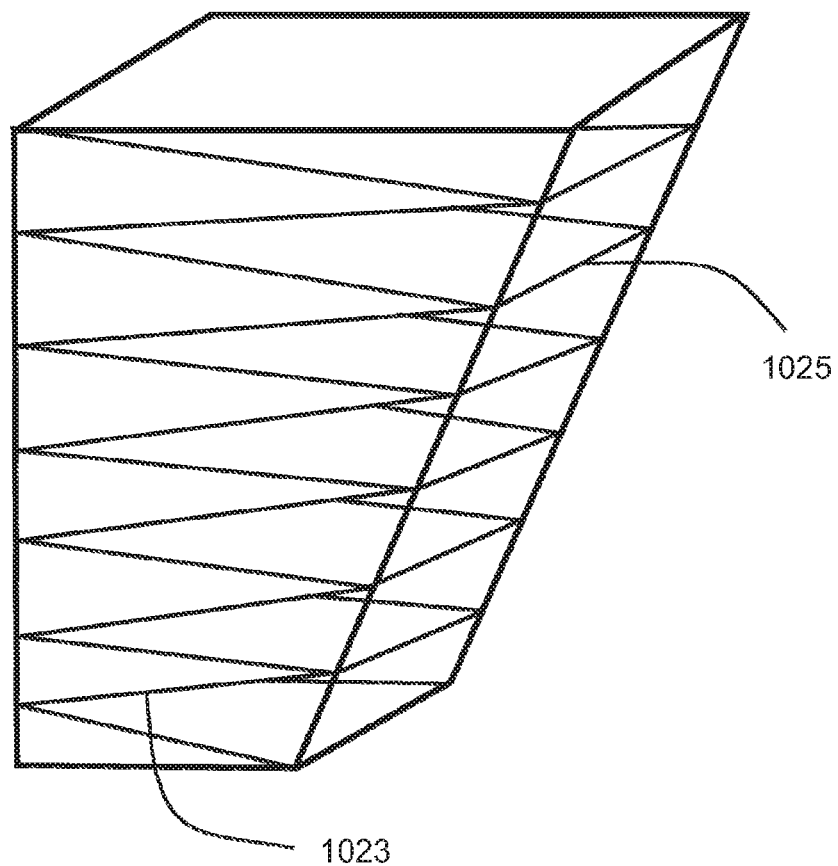

FIG. 26 is a first folding type as a schematic.

Figure 27:
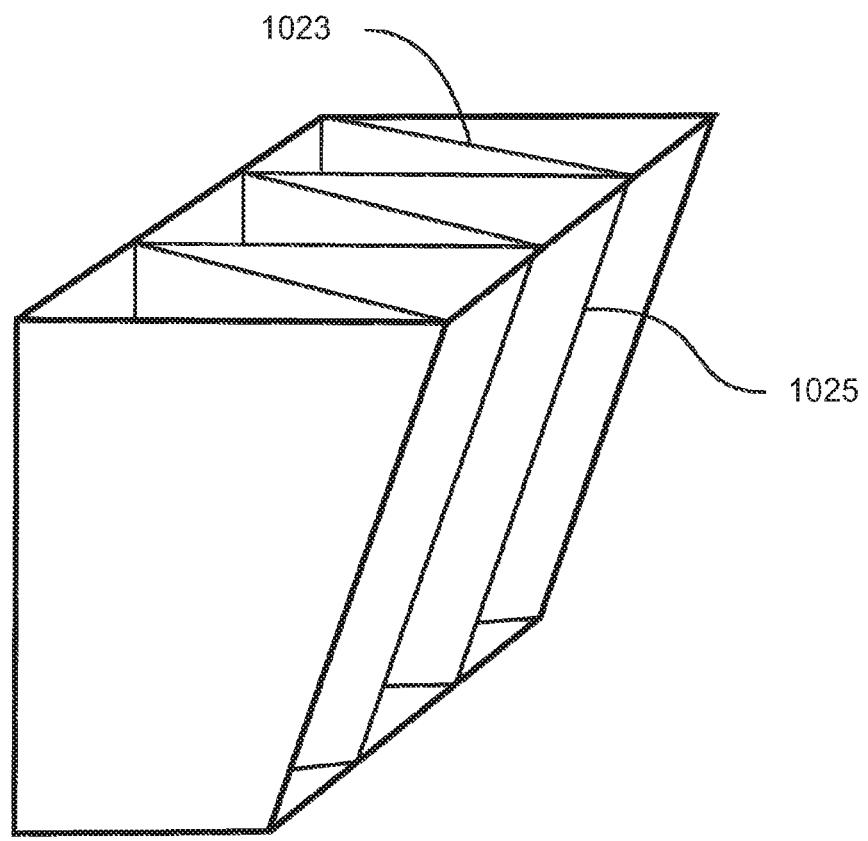

FIG. 27 shows an alternative folding type as a schematic.

Figure 28:
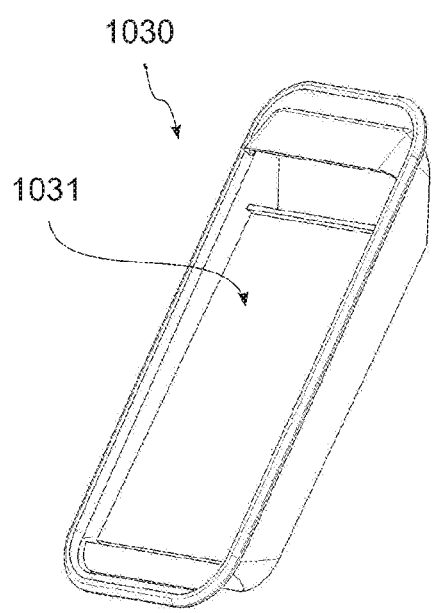

FIG. 28 is a front view of the secondary filter element according to the invention.

Figure 29:
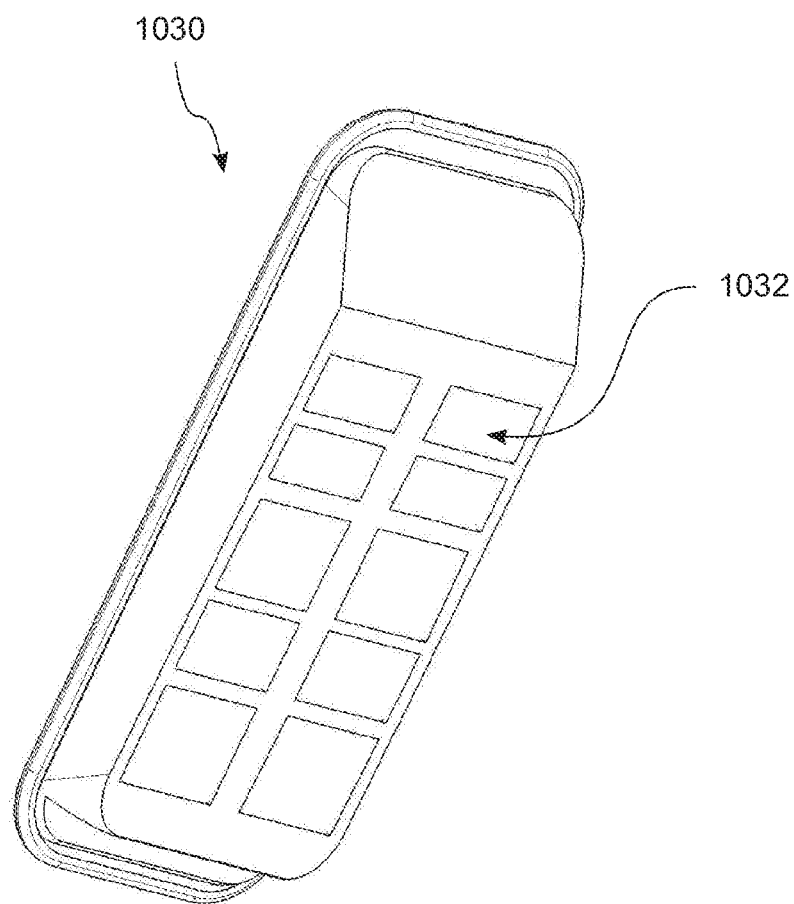

FIG. 29 is a rear view of the secondary filter element according to the invention.

Figure 30:
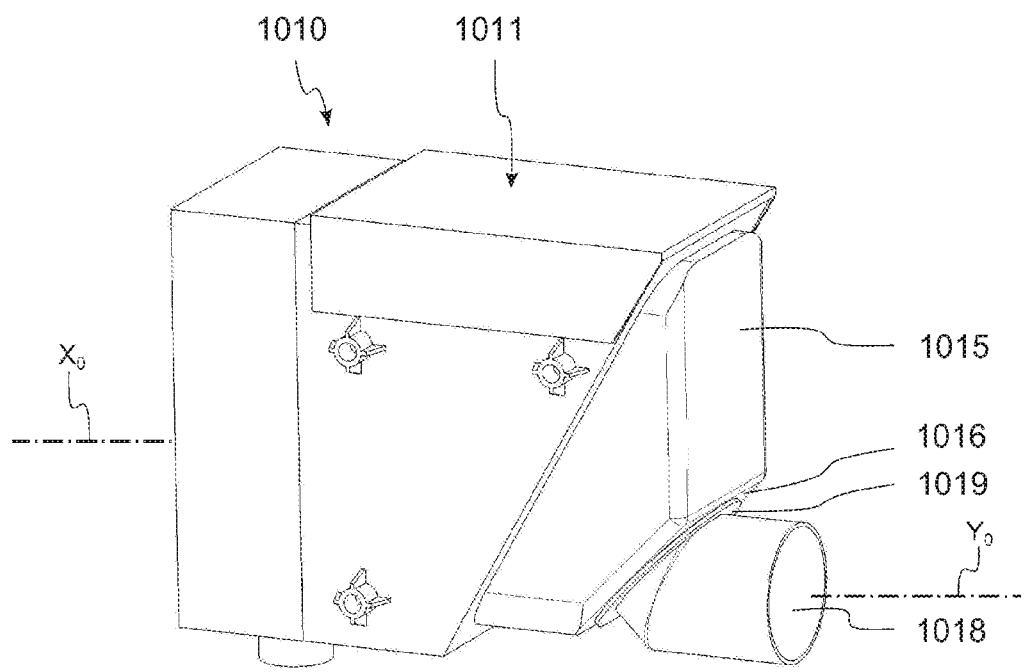

FIG. 30 shows the filter according to the invention of FIG. 20 in a second configuration.

Figure 31:
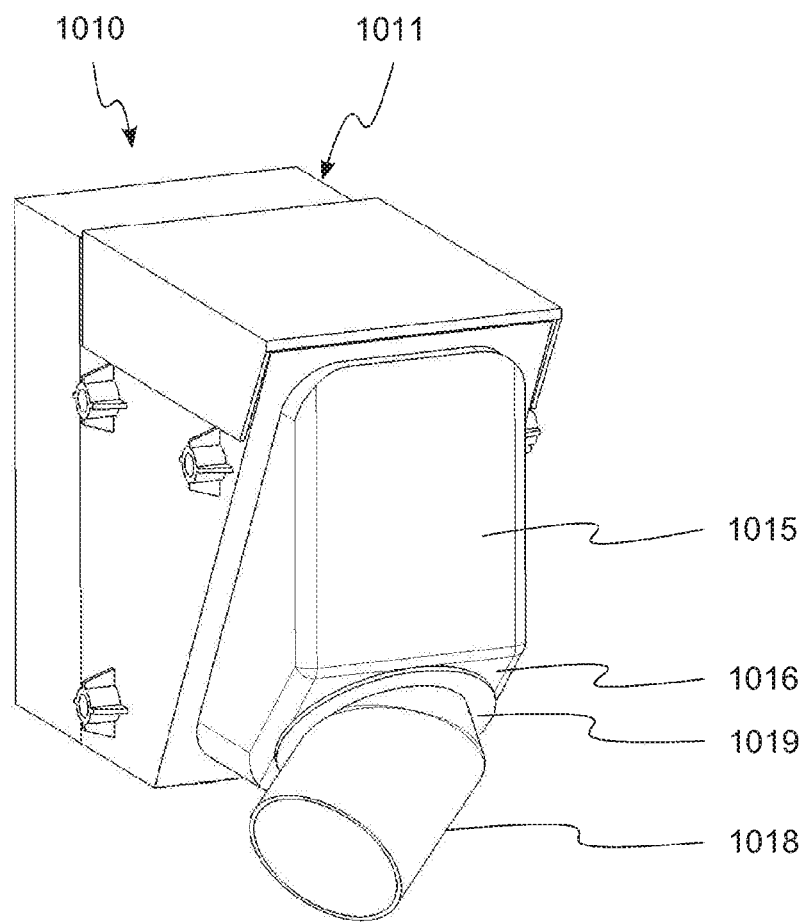

FIG. 31 shows the filter according to the invention of FIG. 20 in a third configuration.

Figure 32:
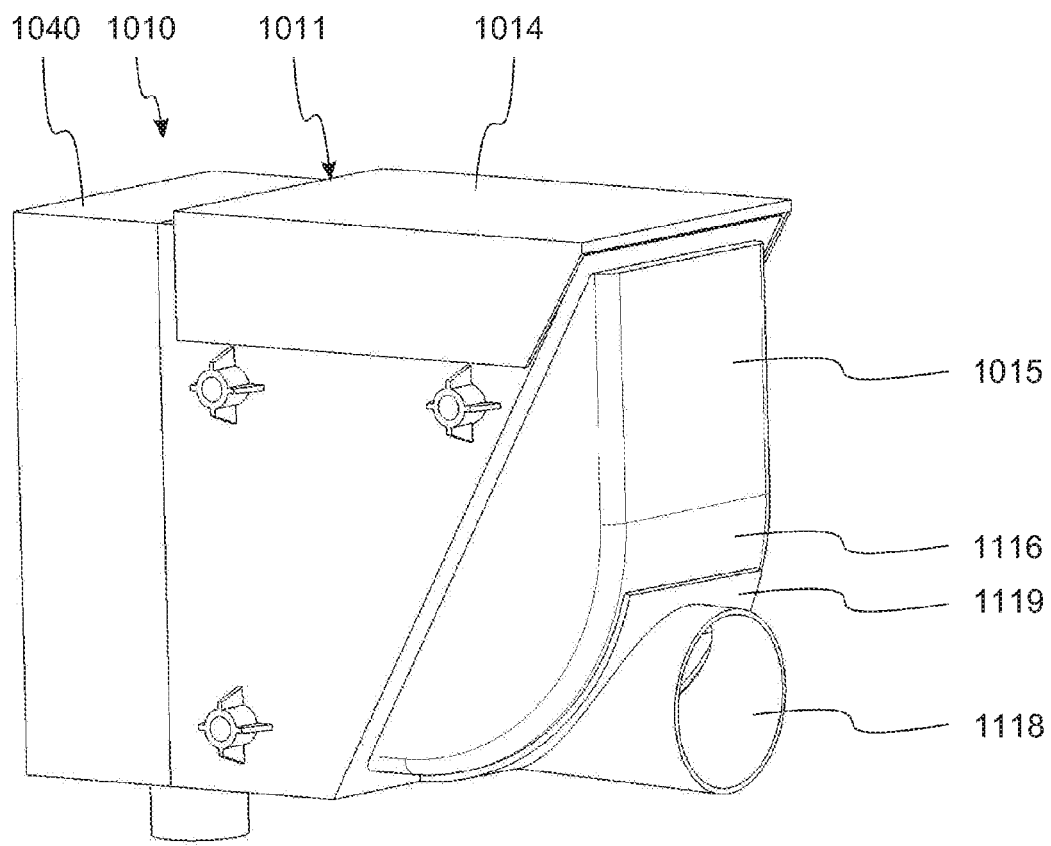

FIG. 32 is a front view of an alternative embodiment of a filter according to the invention.

Figure 33:
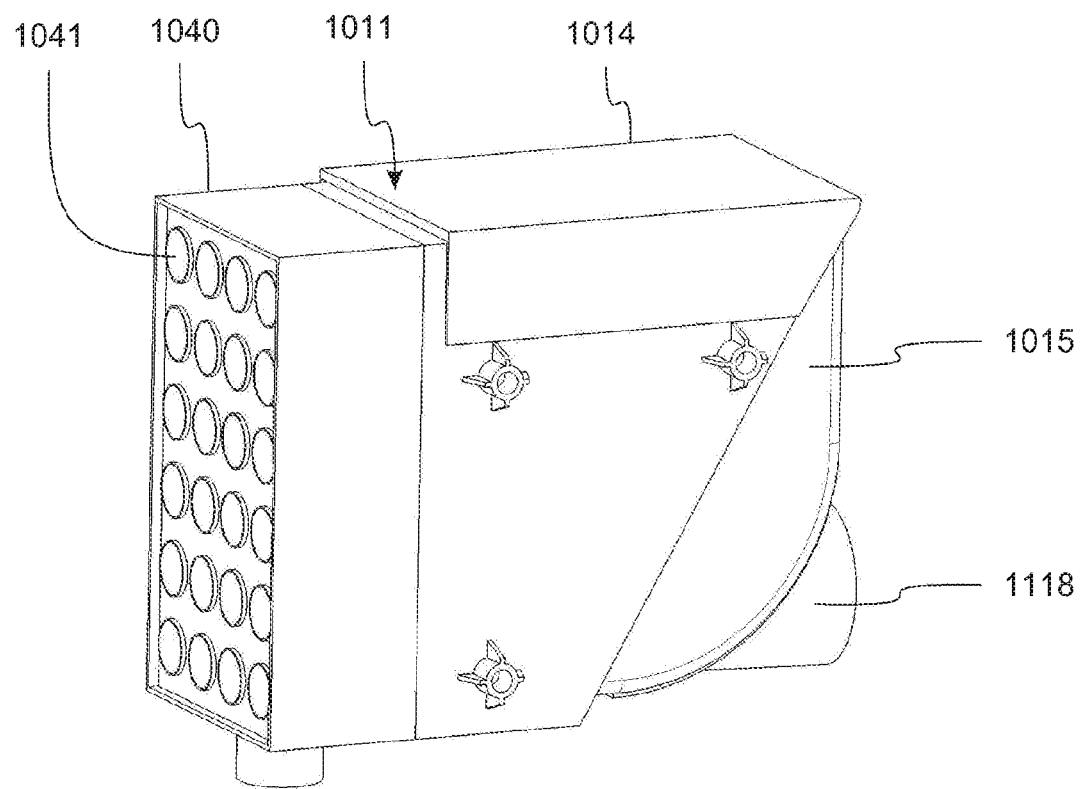

FIG. 33 is a rear view of the filter of FIG. 32.

Figure 34:
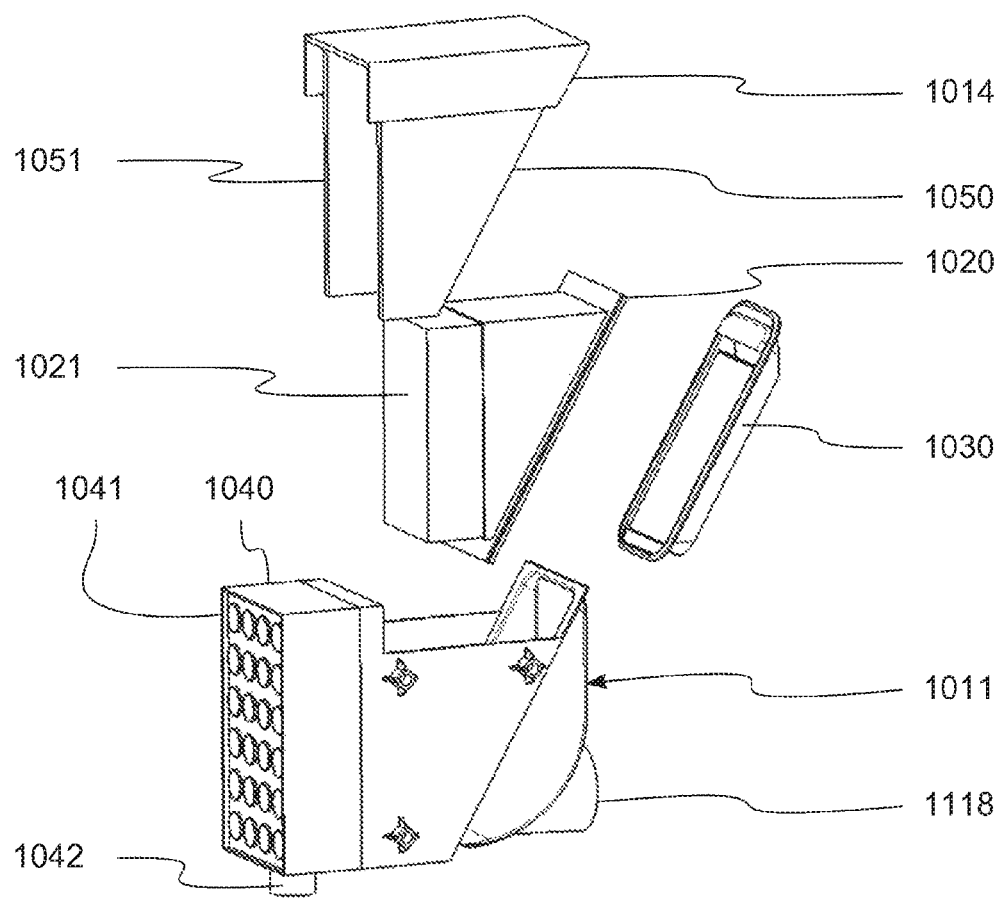

FIG. 34 is an exploded view of the filter of FIG. 32

Figure 35:
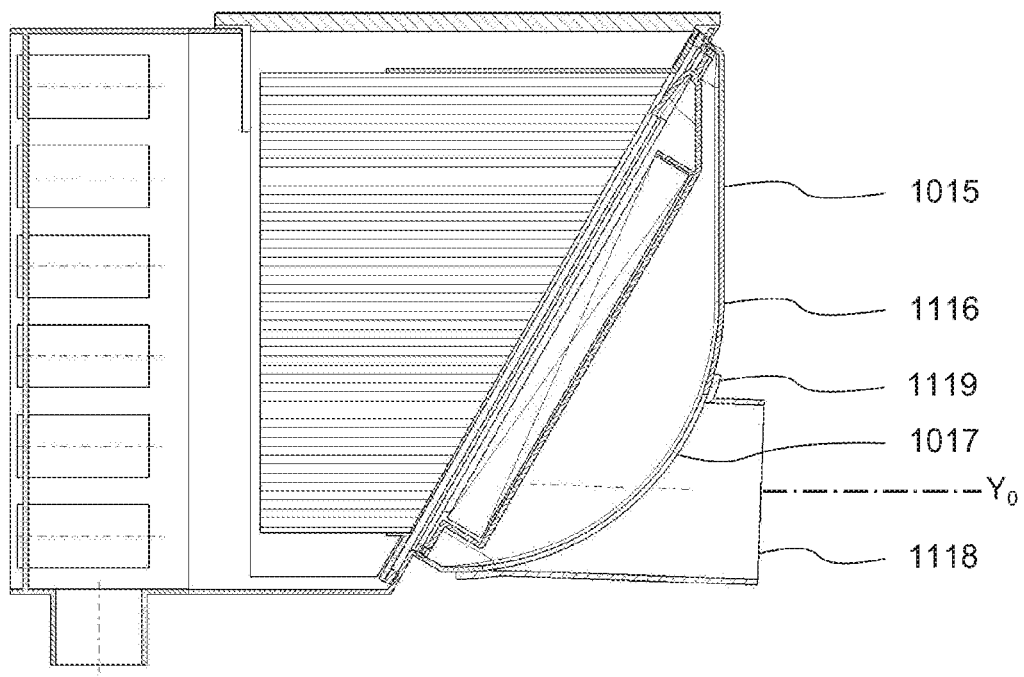

FIG. 35 is a section illustration of the filter of FIG. 32.

Figure 36:
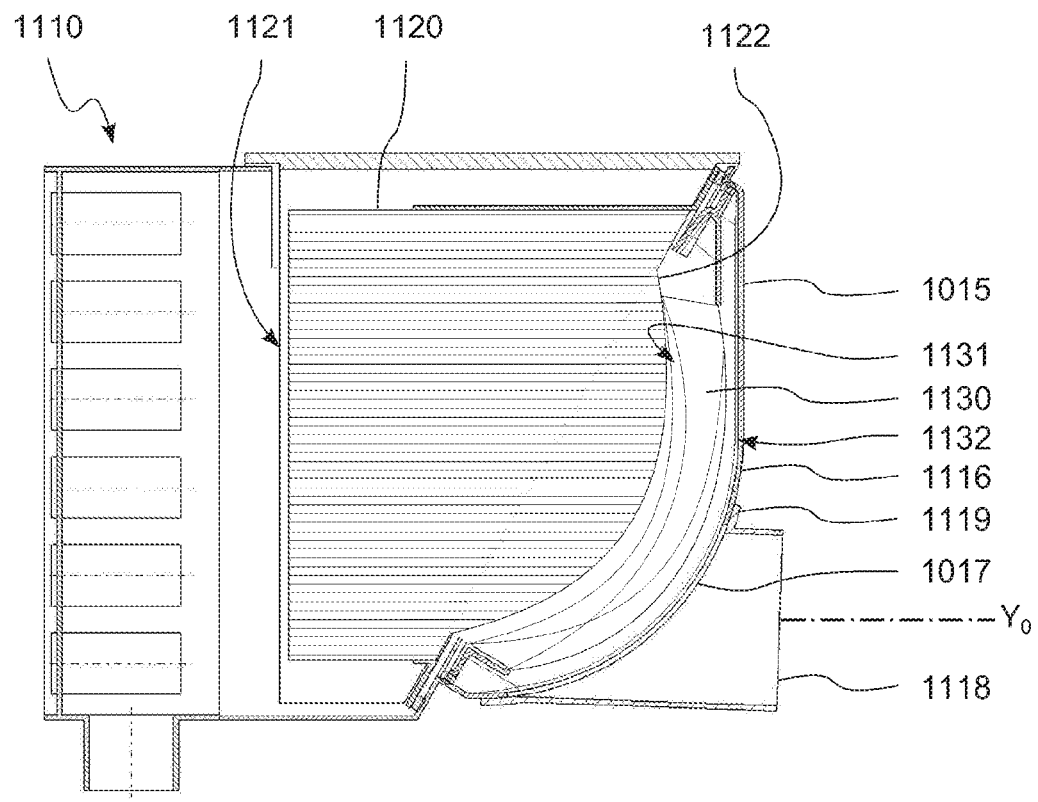

FIG. 36 is a section view of an alternative main filter element and secondary filter element design of the filter of FIG. 32.

PREFERRED EMBODIMENTS OF THE INVENTION

With reference to FIGS. 1 through 5, an embodiment of a filter 10 according to the invention will now be described. Such a filter 10 can be used, for example, in an air intake manifold of a construction or agricultural machine, a compressor or another device with an internal combustion engine, for filtering a fluid, in particular air. The filter comprises a filter housing 12 which can be divided roughly into a raw-side area 14 and a clean-side area 16.

The filter 100 is flowed through along a main inflow direction X. On an inflow side 16 the fluid to be filtered impacts on a coarse or a pre-separation module 18 which is designed in the present case as a cyclone block. In the cyclone block 18, a plurality of individual pre-separation cells 20 are connected in parallel in a so-called multi-cyclone block. The dust and/or water that has been pre-separated in the cyclone block 18 is removed through a discharge socket 22 from the filter housing 12.

Downstream of the cyclone block 18, the fluid to be filtered flows into the main filter cartridge 100. The main filter cartridge 100 is embodied in the present case as a prism. An inflow surface 110 of the main filter cartridge 100 is not positioned parallel to an outflow surface 112 of the main filter cartridge 100. Instead, the inflow surface 110 and the outflow surface 112 are positioned at an angle to each. In the present case, the inflow surface 110 of the main filter cartridge 100 is smaller with regard to the desired surface area than the outflow surface 112 of the main filter cartridge 100. At the outflow side of the main filter cartridge 100, a secondary filter cartridge 200 is provided in the filter housing 12. A main inflow surface 210 of the secondary filter element 200 is oriented toward the outflow surface 112 of the main filter cartridge 100 and in particular is arranged parallel thereto. An outflow surface 212 is oriented in this embodiment parallel to the main inflow surface 210 of the secondary filter cartridge 200. Due to the slanted position of the outflow surface 112 of the main filter cartridge 100, already upon inflow of the fluid from the main filter cartridge 100, but also upon inflow from the secondary filter cartridge 200, a deflection of the main flow direction X is occurring. Due to the outflow geometry of the filter housing 12 in the outflow area 24, the flowing fluid is deflected to the outflow direction Y and guided toward an outflow socket 26. In the present case, the main outflow direction Y is substantially perpendicular to the main inflow direction X.

However, other outflow directions are conceivable also. This will be explained in more detail particularly in connection with FIGS. 15 to 19.

The main filter cartridge 100 comprises a main filter cartridge inflow surface 110, a main filter cartridge flow direction X1, a main filter cartridge outflow surface 112 as well as a seal 116 arranged on a sealing surface 114 for fluid-tight separation of the raw-side area 14 and of the clean-side area 16 of the filter housing 12. A secondary filter cartridge 200 with a secondary filter cartridge inflow surface 210, a secondary filter cartridge flow direction Y1, and a secondary filter cartridge outflow surface 212 is arranged downstream of the main filter cartridge 100. The sealing surface 114 of the main filter cartridge 100 is slantedly positioned relative to the main flow direction Y1 of the main filter cartridge 100. In particular, the sealing surface 114 is positioned at an angle α that is preferably between 5° and 45° (see FIG. 4), in particular the angle amounts to 24°±10° and 24°±5°. In the present embodiment, the angle α is 24° (see FIG. 4).

The secondary filter cartridge inflow surface 210 extends substantially parallel and at a spacing to the sealing surface 114 of the main filter cartridge 100. The spacing is less than 2 cm; in the present embodiment, the spacing is 1 cm.

FIGS. 11 to 14 show the main filter cartridge 100. The main filter cartridge 100 comprises an inflow surface 110 (first lateral face) and an outflow surface 112 (third lateral face). The arrow for the insertion direction Z points in FIG. 11 to the second lateral face which is oppositely positioned to the smaller fourth lateral face. The top face can be recognized in FIGS. 11 and 12 as the surface on which the marking for the main flow direction X1 is arranged. It is positioned parallel and congruent to the base face. Base face and top face as well as the second and fourth lateral faces are perpendicularly oriented relative to the first lateral face (inflow surface 110). Inflow to the main filter cartridge 100 is occurring along a main inflow direction X and flow through it occurs along a main flow direction X1. The main filter cartridge 100 comprises a filter cartridge frame 118 that receives a filter body 120. The filter body 120 is in the present case designed as a folded bellows. Inflow-side fold edges 122 are positioned opposite outflow-side fold edges 124. Inflow-side fold edges 122 and outflow-side fold edges 124 are positioned parallel, substantially perpendicular to the main flow direction X1, and substantially horizontally in FIGS. 11 to 14. This orientation of the fold edges 122, 124 enables a variation of the fold depth in the direction of an insertion direction Z. Along the insertion direction Z, the main filter cartridge 100 is insertable into the filter housing 12 of the filter 10. In the present embodiment, the fold height is reduced along the insertion direction Z. This effects a tilting of the inflow surface 110 relative to the outflow surface 112.

In the area of the outflow surface 110, the filter frame 118 has a sealing surface 114 along which a circumferentially extending seal 116 is provided. The seal serves for separating the raw-side area 14 from the clean-side area 16 in the filter housing 12 of the filter 10 when the main filter cartridge 100 is inserted into the filter 10. The seal 116 comprises substantially a U-shape in cross-section.

For reinforcement and better mechanical connection of the seal 116 to the filter frame 118, a web 126 is provided which engages the U-shape of the seal 116. At the same time, the seal 116 can contact the filter body 120 or penetrate it so that an adhesive connection of the filter body 120 with the filter cartridge frame 118 and a fluid-tight sealing action between filter body 120 and filter cartridge frame 118 is generated at the same time.

Moreover, the seal 116 comprises a spacer structure which is embodied in the present case as support knobs 128. The support knobs 128 are components of the sealing material of the seal 116. As can be seen in the cross-sectional view of FIG. 4, the support knobs 128 contact the secondary filter cartridge 200, in particular a secondary filter cartridge frame, when main filter cartridge 100 and secondary filter cartridge 200 are inserted in the filter housing 12 of the filter 10. In this state, the secondary filter cartridge 200, even for vibration excitation that can be transmitted, for example, through the filter housing 12, cannot move out of a seal seat in the filter housing 12. Also, by means of the support knobs 128 it is ensured that the secondary filter cartridge 200 after installation of the main filter cartridge 100 and closure of the cover 13 is seated in the correct position in the filter housing 12.

A plurality of the support knobs 128 are positioned along the seal 116 on the side which is facing the outflow surface 112. They can be produced, for example, integrally with the seal 116 when producing the seal 116.

The seal 116 is located at the outflow surface 112 of the main filter cartridge 100 and acts in a direction that is perpendicular to the outflow surface 112, i.e., substantially axially along the main flow direction X1.

The main filter cartridge 100 comprises at its inflow side 110 an edge protection 130 which is extending externally circumferentially about the filter frame 118. The edge protection 130 is designed such that upon tapping of the main filter cartridge 100, for example, for cleaning, impacts against the filter frame 118 can be absorbed and at least partially compensated. In this way, breakage of the filter frame 118 or other damages of the filter cartridge 100, for example of the filter body 120, can be avoided. The edge protection 130 extends circumferentially about the inflow-side edge of the filter element 100. In this context, individual interruptions, for example, the notches 134 can be provided. The notches 134 are generated when producing the edge protection 130. In this context, the filter frame 118 together with filter body 120 is positioned in a casting mold. Webs secure the spacing between the casting mold bottom and the filter body 118 and cause the formation of the notches 134 during the casting process.

Cutouts 136 are provided at the inflow-side edge 132. The cutouts 136 penetrate the sidewalls of the filter frame 118 and extend thus perpendicular to the main flow direction X1. During the already mentioned casting process, the casting material for the edge protection 130 penetrates the cutouts 136, contacts the inner walls of the filter cartridge frame 118 and in particular the filter body 120. In this way, a fluid-tight sealing action between the filter body 120 and the filter cartridge frame 118 and at the same time an adhesive connection of the two components is produced. Accordingly, the edge protection 130 is monolithically produced with the adhesive connection between the filter body 120 and the filter cartridge frame 118 and an also required sealing action between the two components. The edge protection 130 can be produced, for example, of a foamable polyurethane. However, also silicone-based material systems are conceivable.

The filter cartridge 100 comprises a grip 138. The grip 138 interacts with the cover 13 of the filter 10 and ensures reliable seating of the main filter cartridge 100 in the filter housing 12 and, at the same time, exerts pressure directed axially in the direction of the main flow direction X1 on the seal 116 and ensures in this way a fixed seal seat of the main filter cartridge 100 in the filter housing 12.

Figure 1:
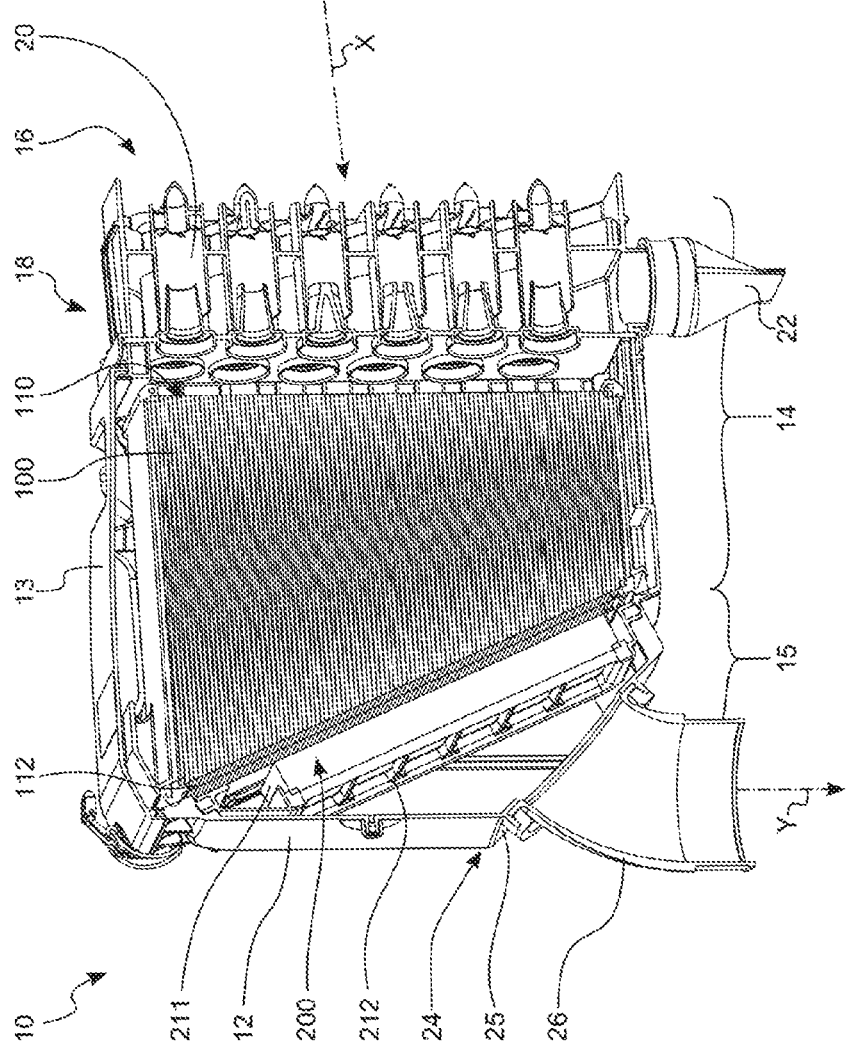
FIG. 1 is a perspective section illustration of an embodiment of a filter according to the invention with inserted main filter cartridge and secondary filter cartridge.
Figure 2:
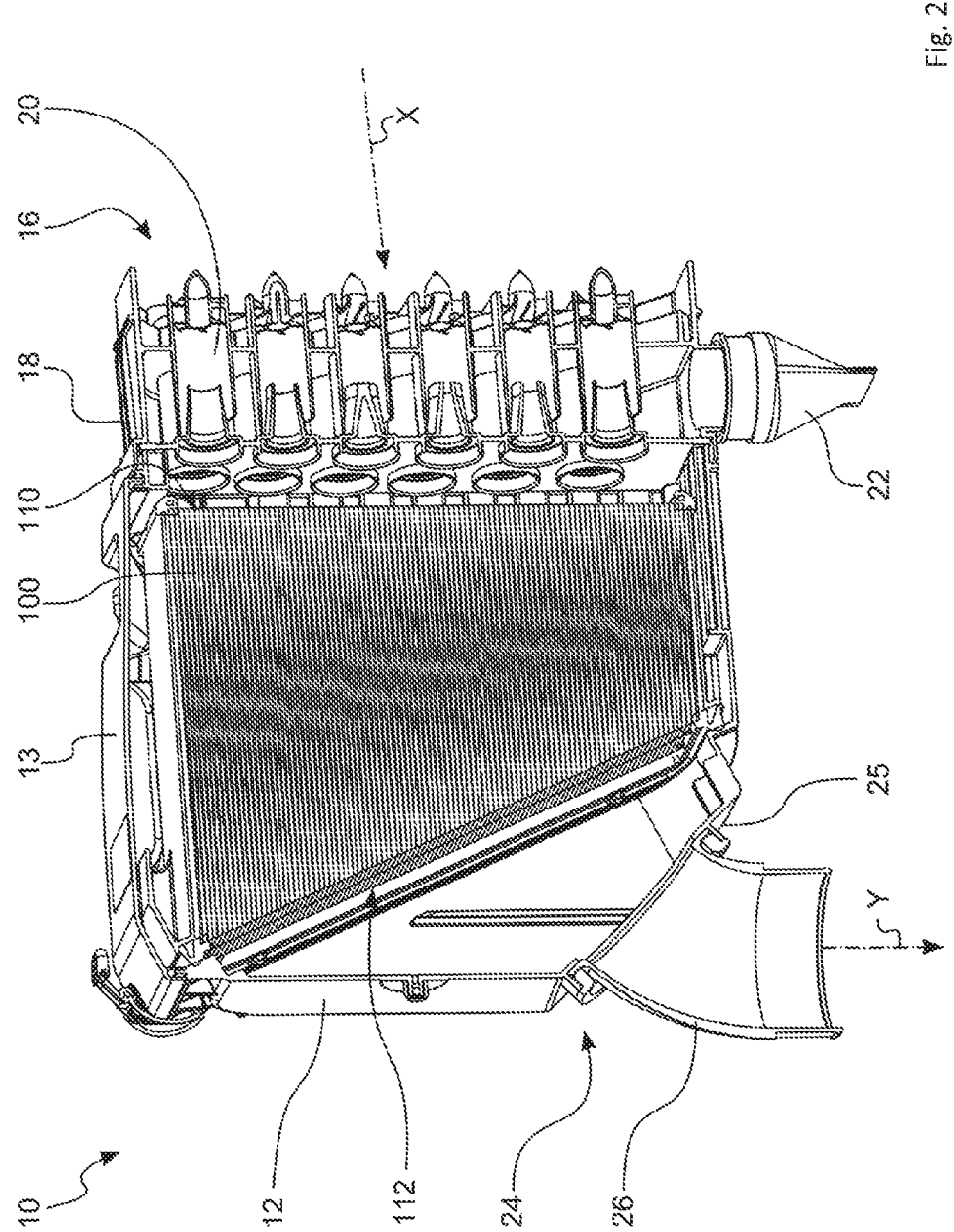
FIG. 2 shows the filter of FIG. 1 without inserted secondary filter cartridge.
Figure 3:
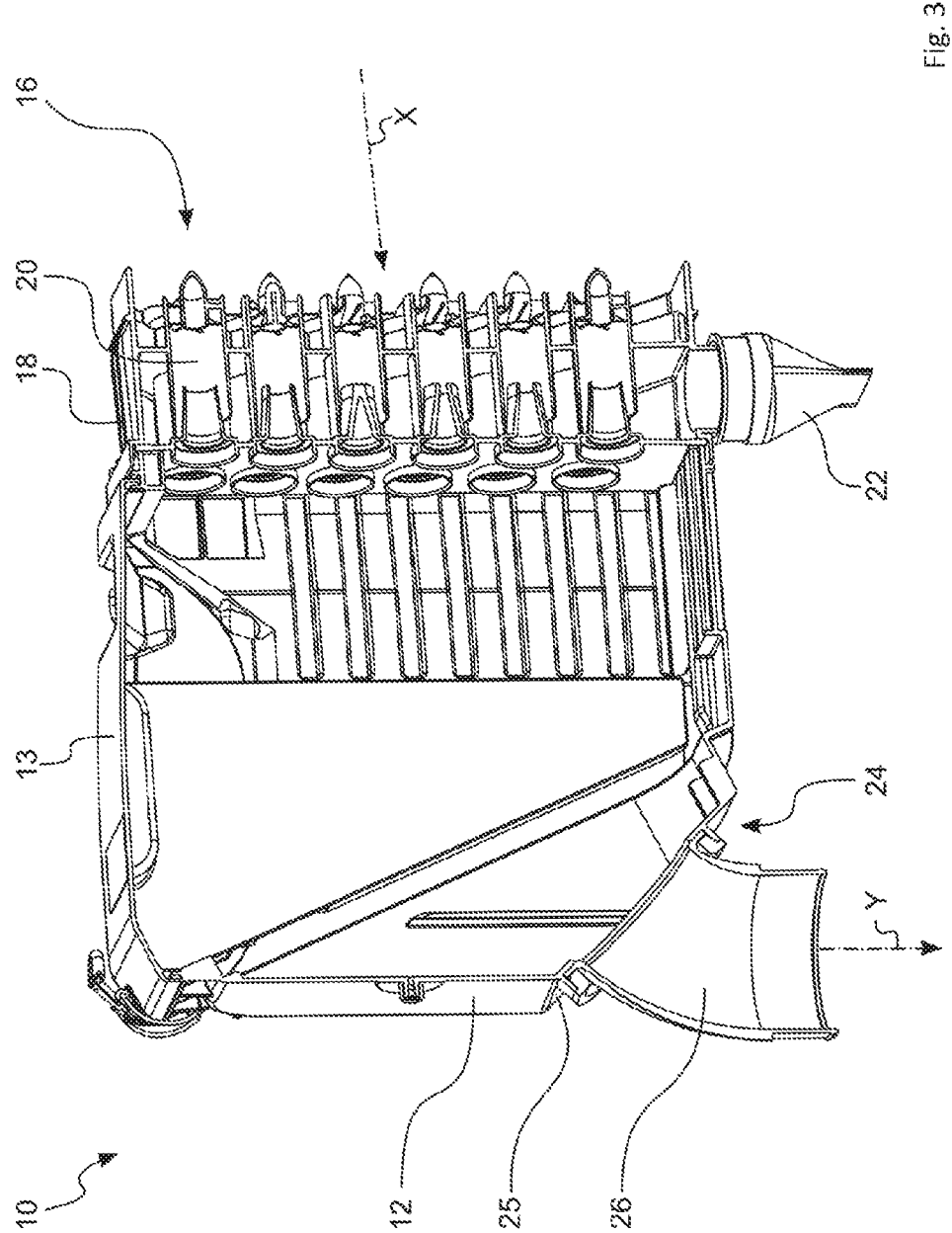
FIG. 3 shows the filter of FIG. 1 without inserted main filter cartridge.
Figure 4:
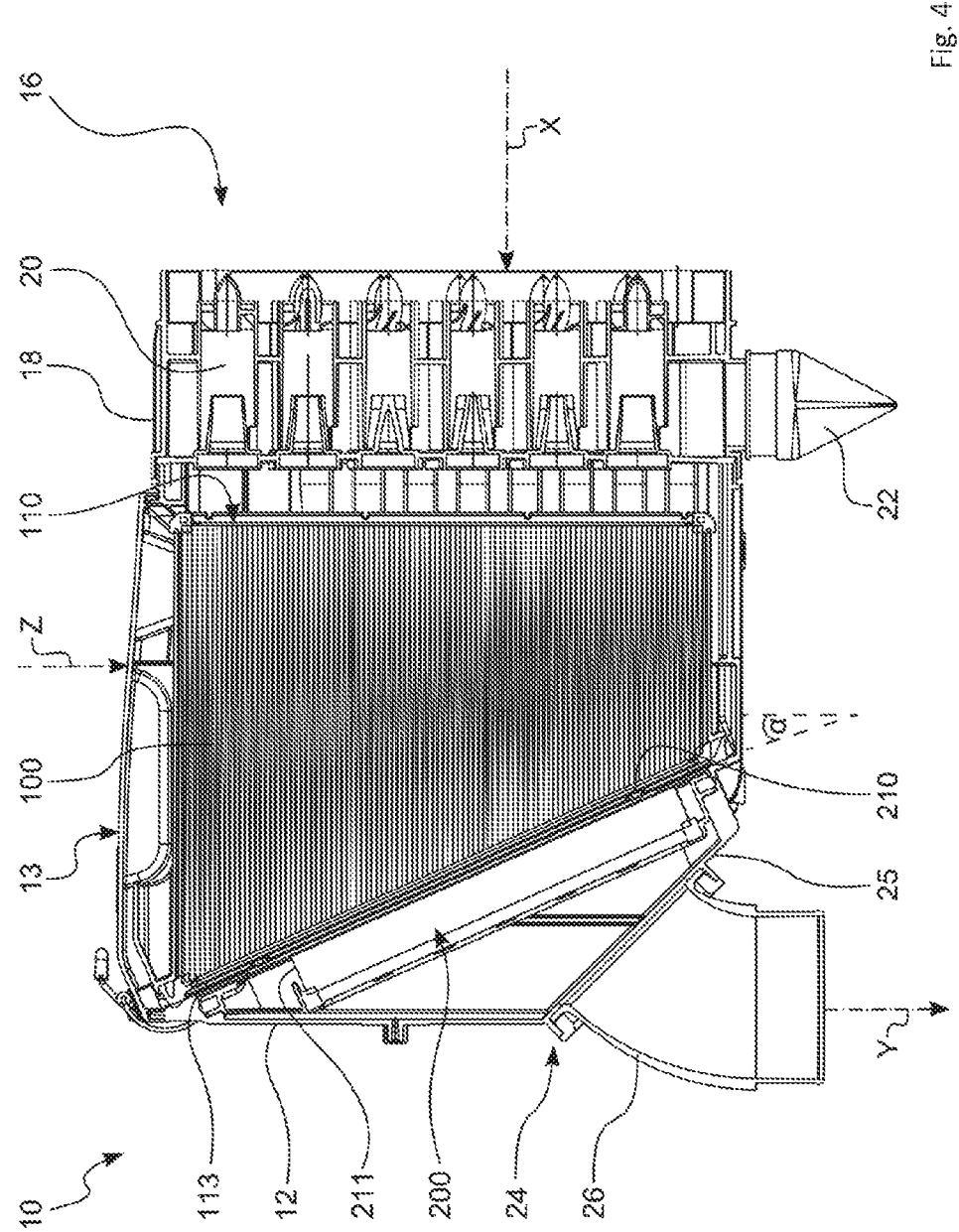
FIG. 4 shows the filter of FIG. 1 in a cross-sectional view.
Figure 6A:
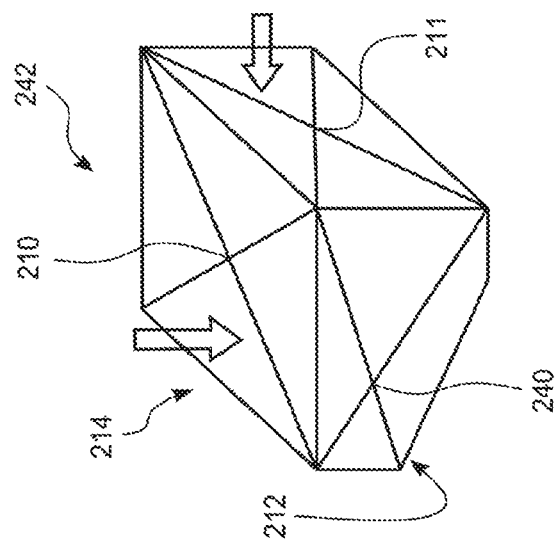
FIG. 6a is a perspective view of an alternative secondary filter cartridge filter body according to the invention.
Figure 6:
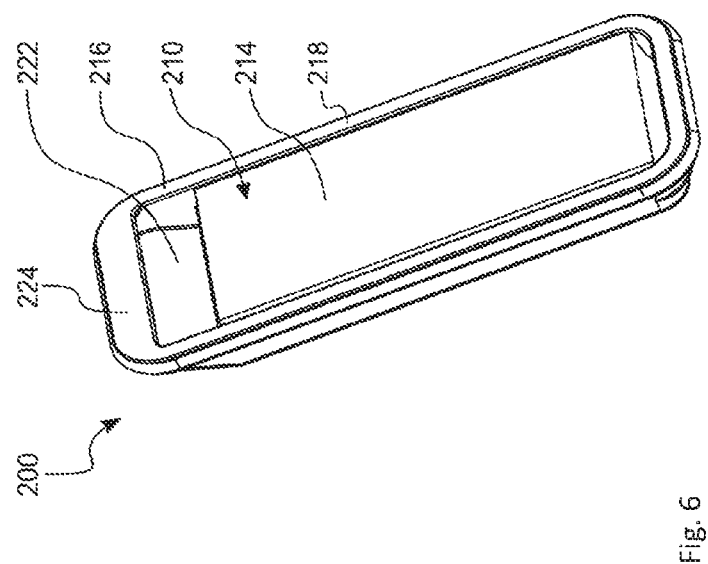
FIG. 6 is a perspective view of a secondary filter cartridge according to the invention with filter body.
Figure 7:
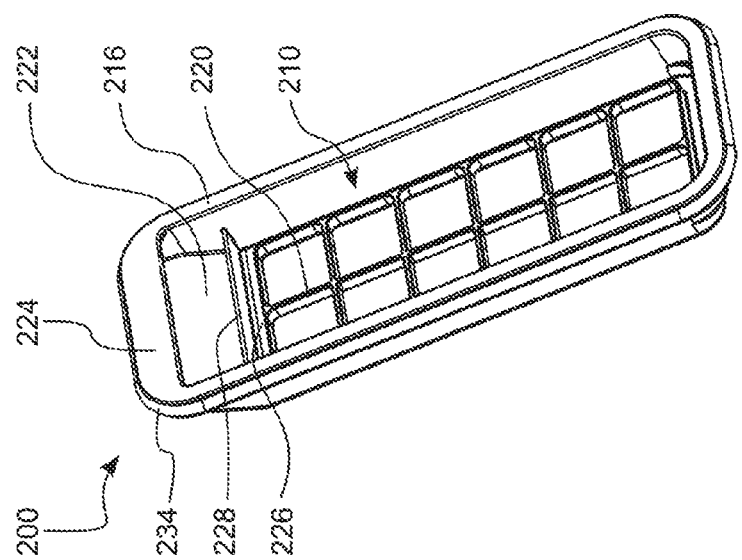
FIG. 7 is a perspective view of the secondary filter cartridge of FIG. 6 without filter body.
Figure 8:
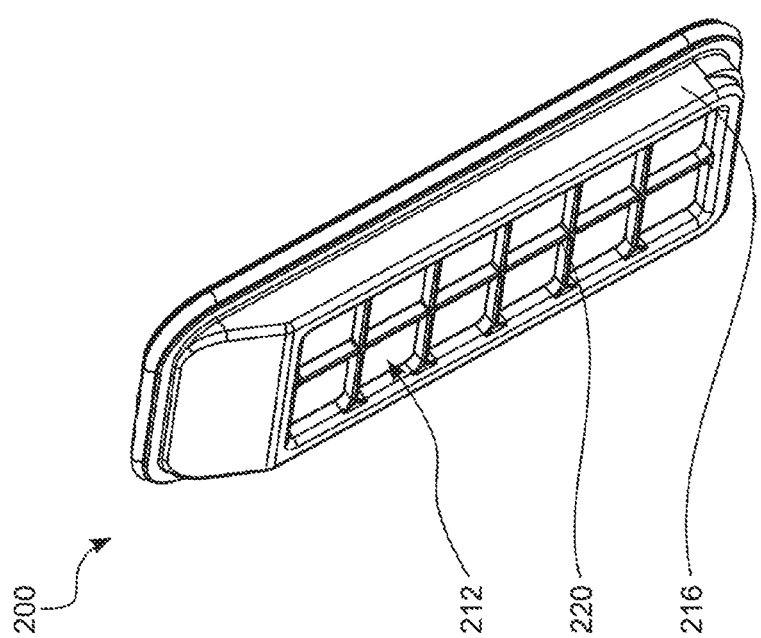
FIG. 8 is another perspective view of the secondary filter cartridge of FIG. 6 without filter body.
Figure 9:
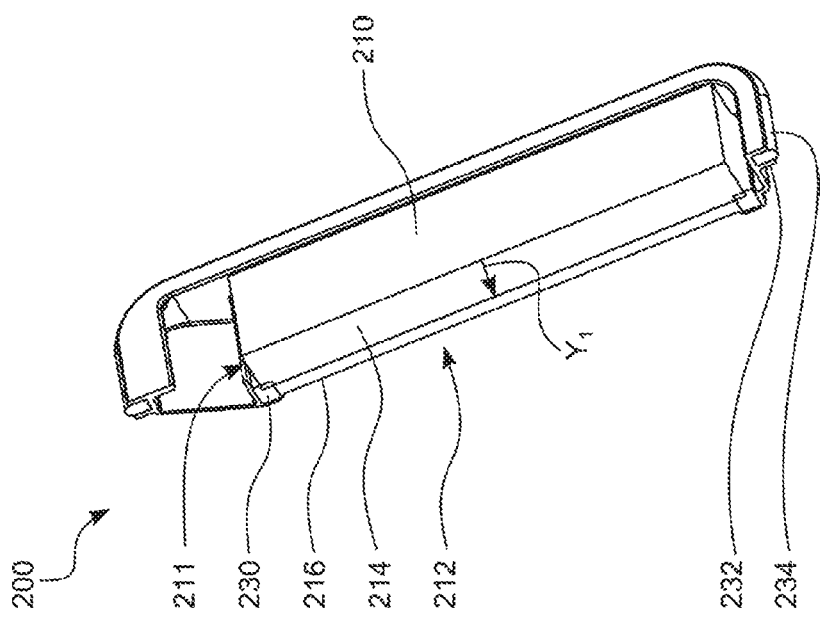
FIG. 9 is a perspective section view of the filter of FIG. 6.
Figure 10:
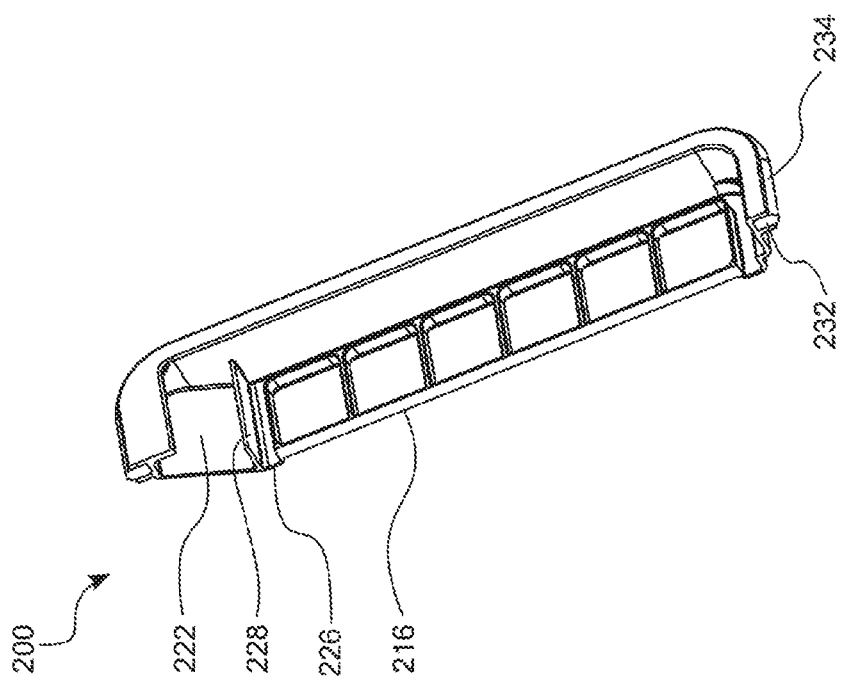
FIG. 10 is a section view of the filter of FIG. 7.
Figure 11:
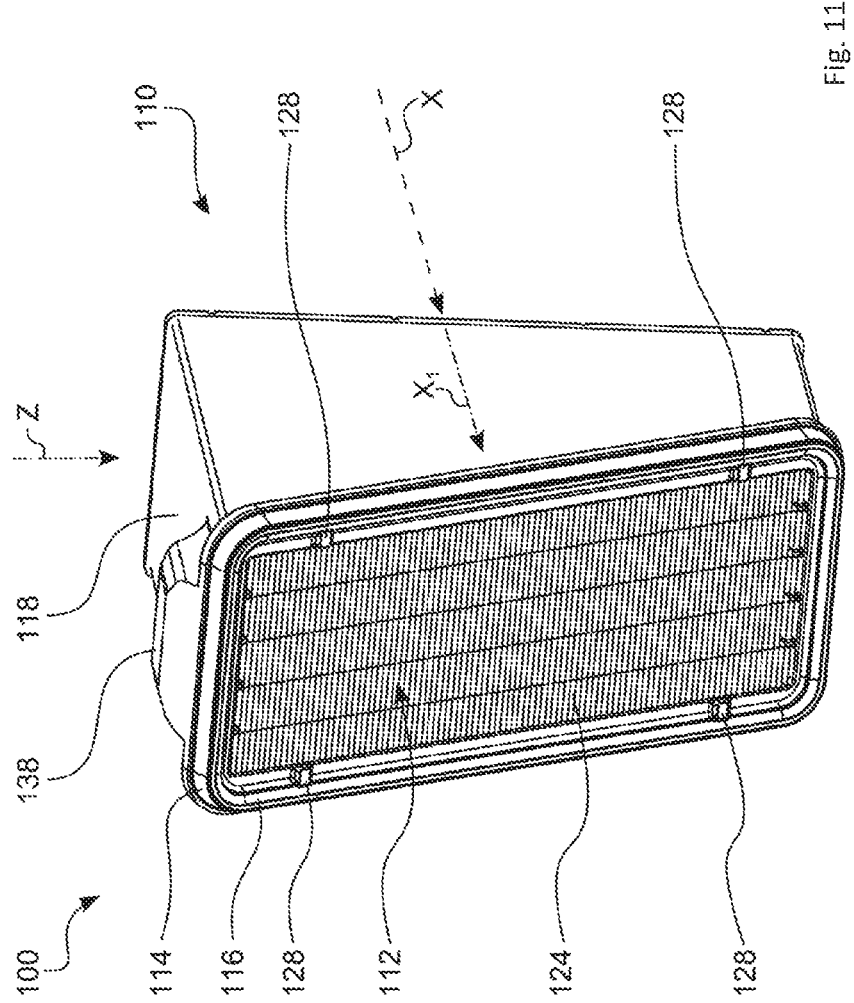
FIG. 11 is a perspective front view of a main filter cartridge according to the invention.
Figure 11A:
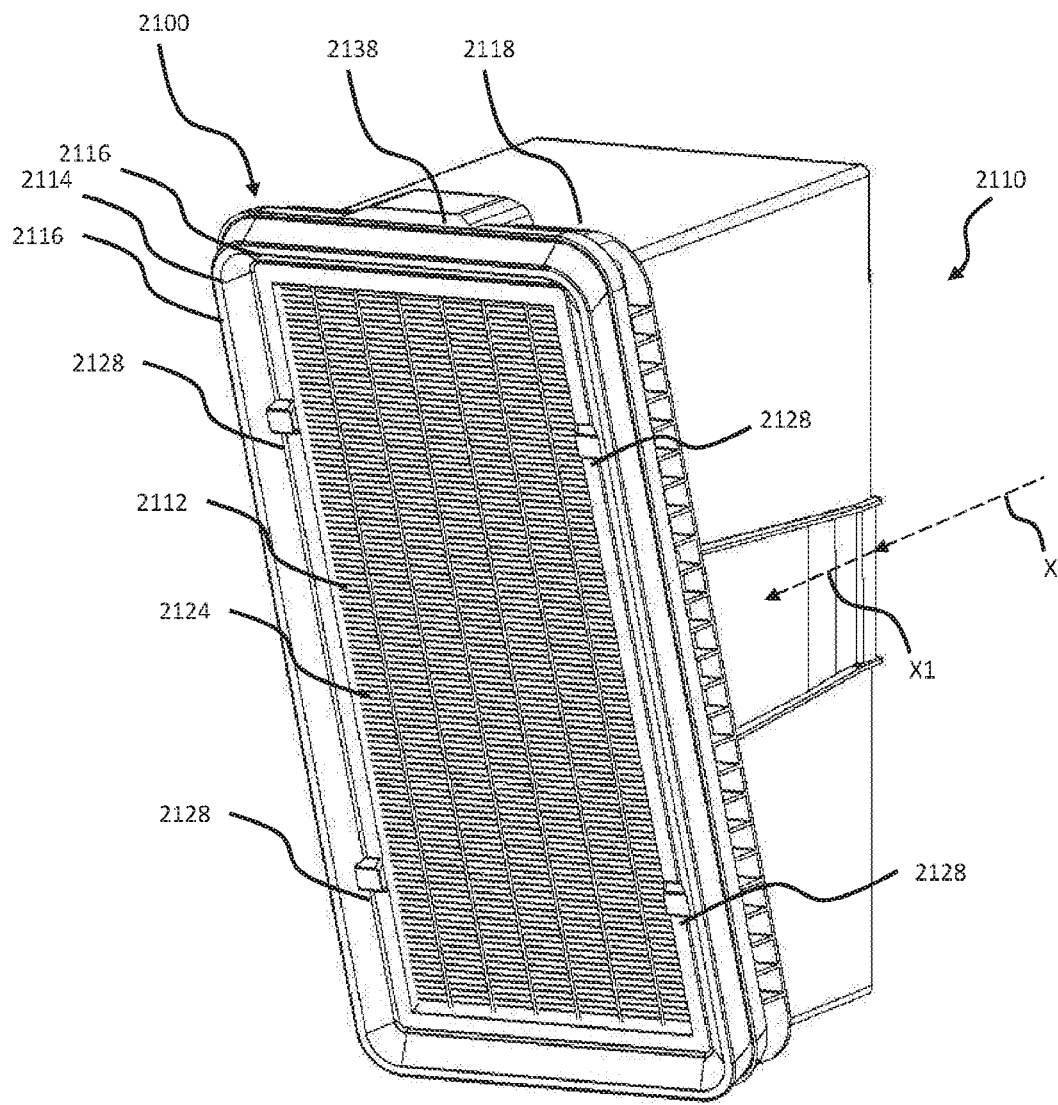
FIG. 11a is a perspective front view of a second embodiment of a main filter cartridge according to the invention.
Figure 12A:
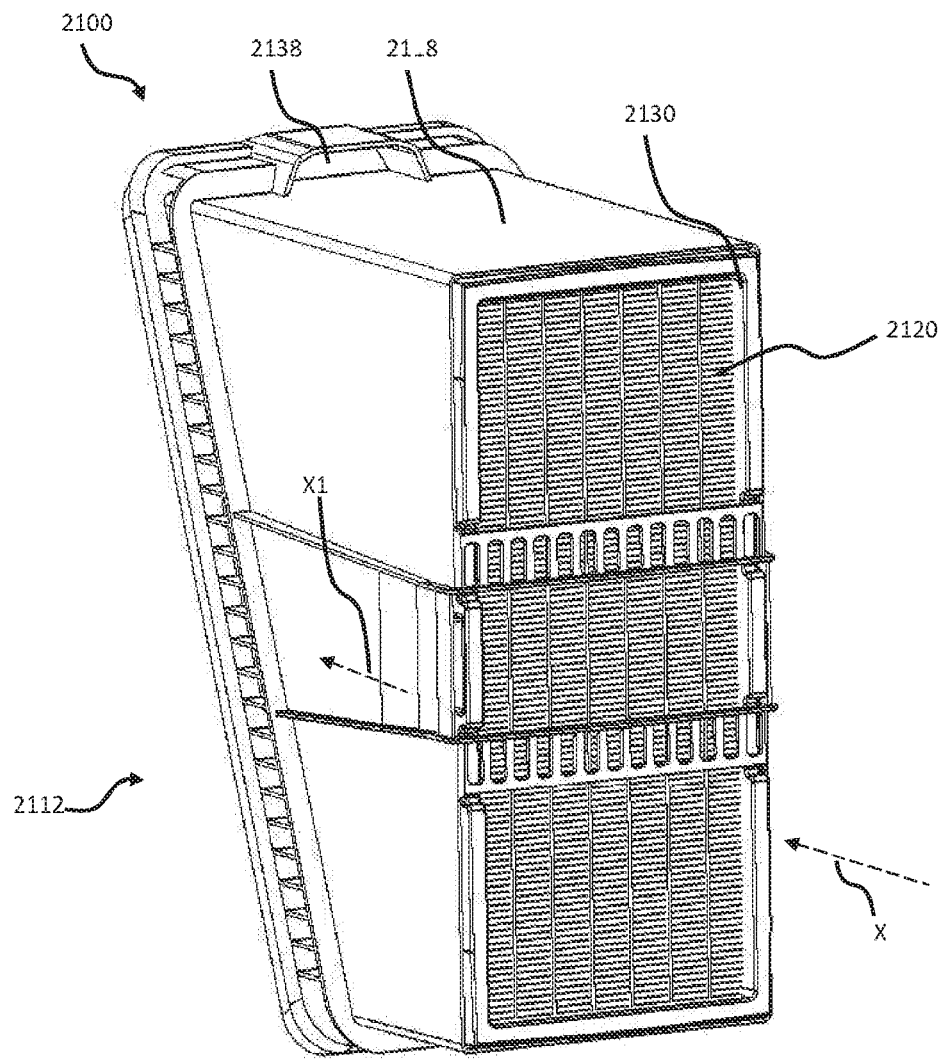
FIG. 12a is a perspective rear view of the main filter cartridge of FIG. 11a in a support frame.
Figure 12B:
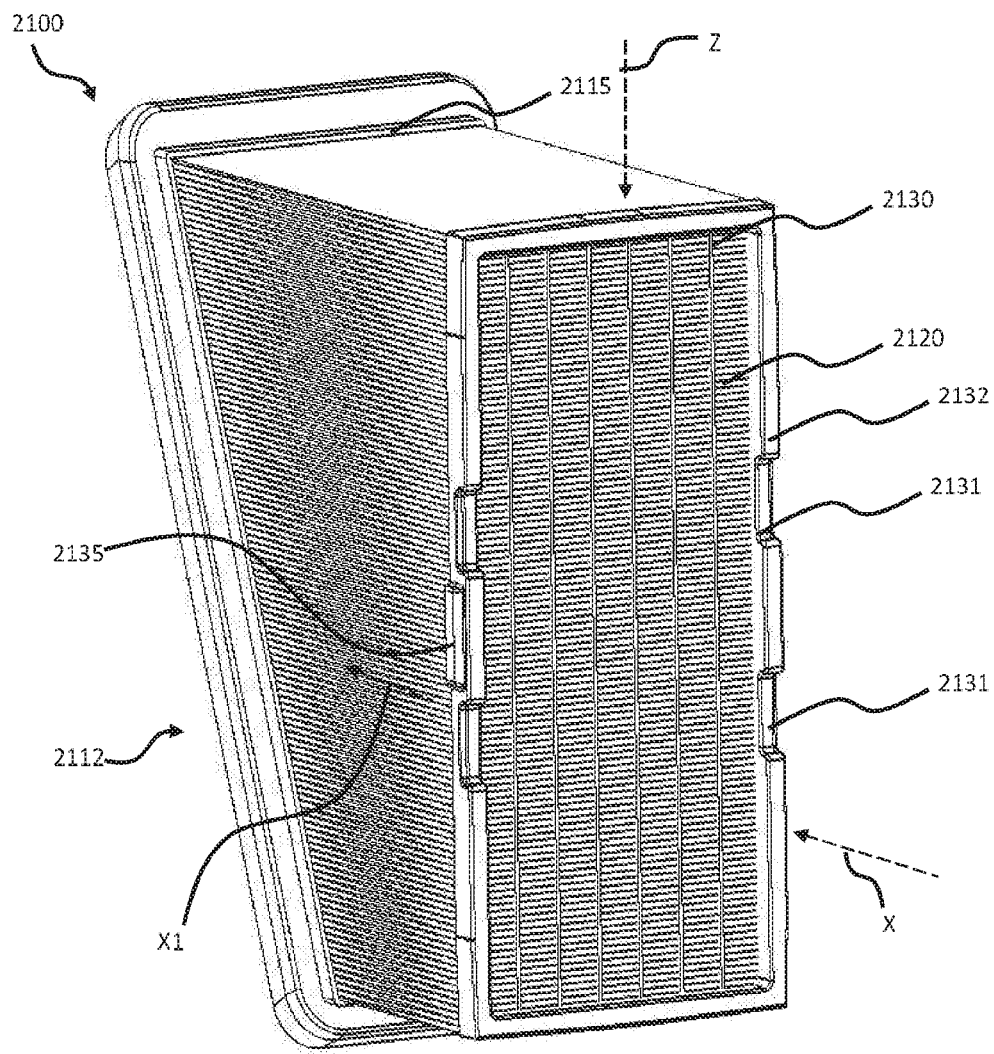
FIG. 12b is a perspective rear view of the main filter cartridge of FIG. 11a without support frame.
Figure 13A:
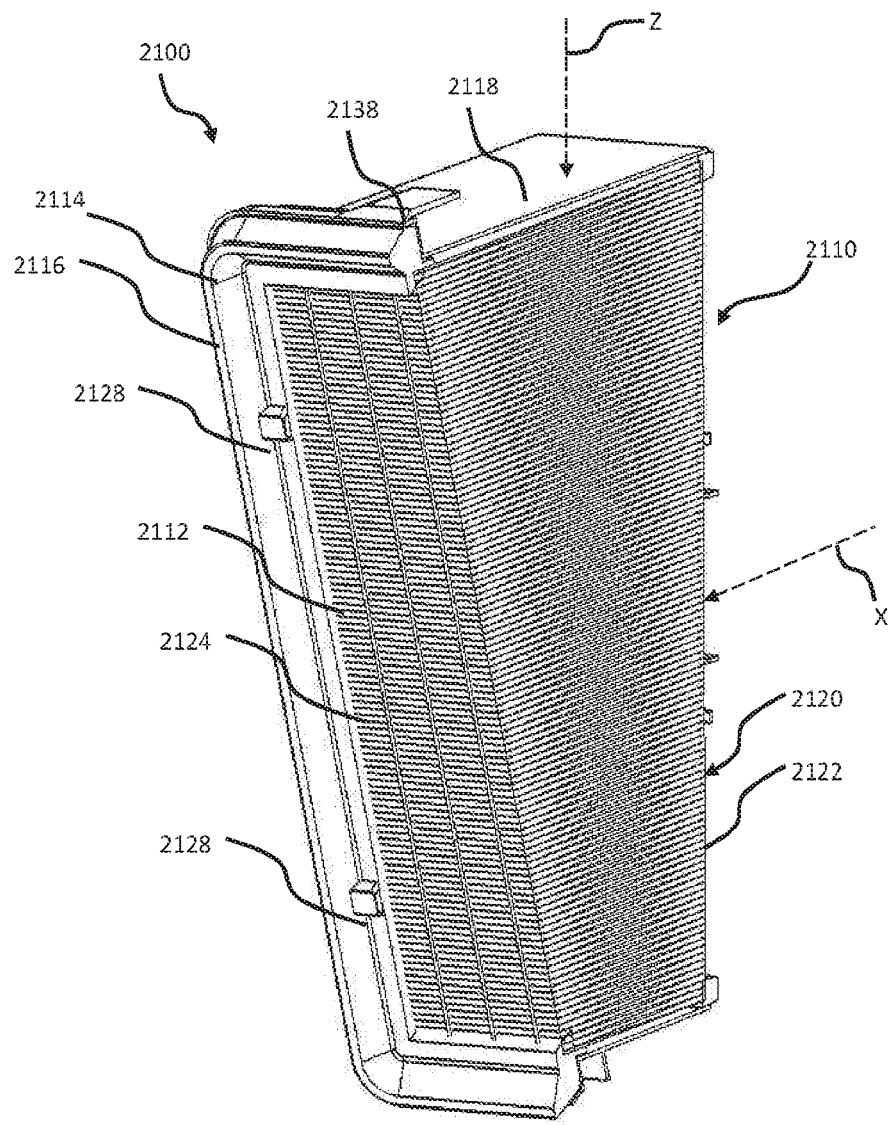
Figure 13B:
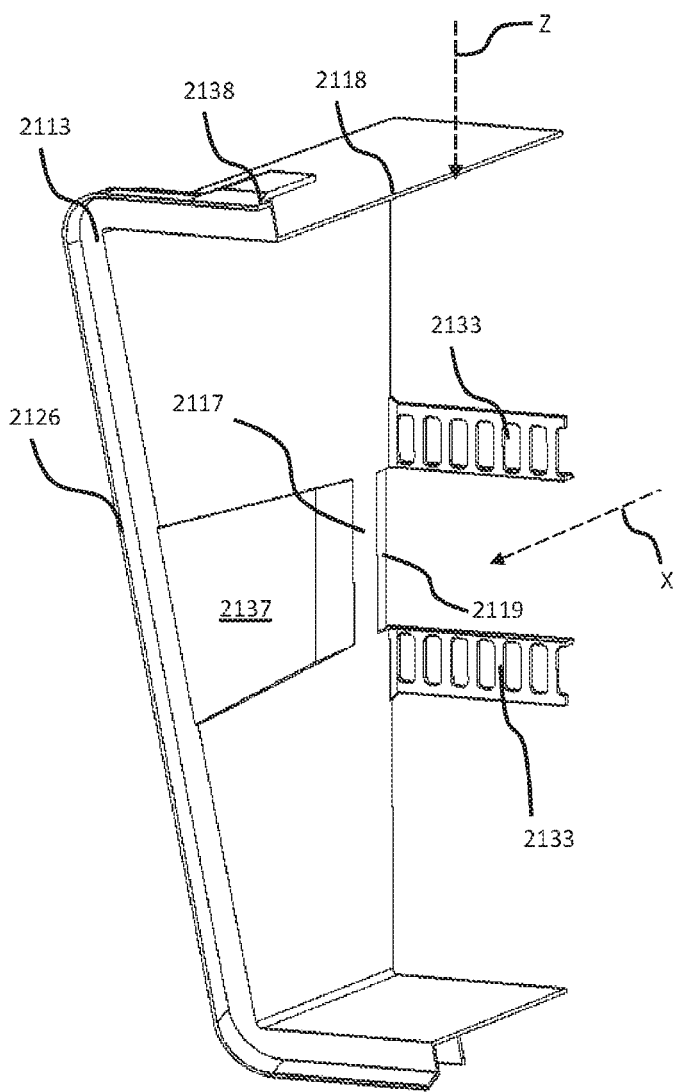
Figure 13C:
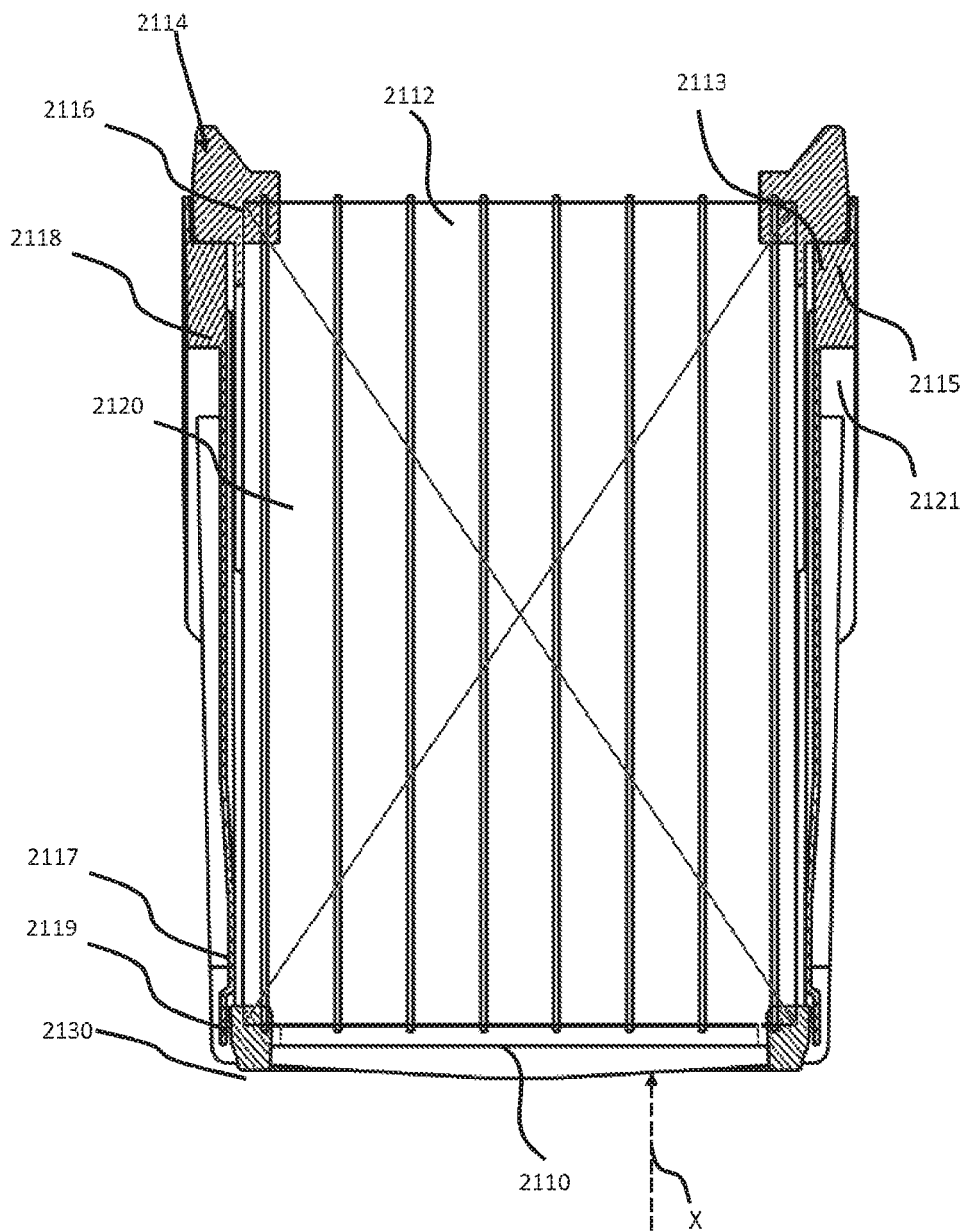
FIG. 13c is a section view of the main filter cartridge of FIG. 11a in a support frame, wherein the section is extending centrally through the main filter cartridge, parallel to the main flow direction X, perpendicular to the inflow surface, and perpendicular to the installation direction Z.
Figure 13D:
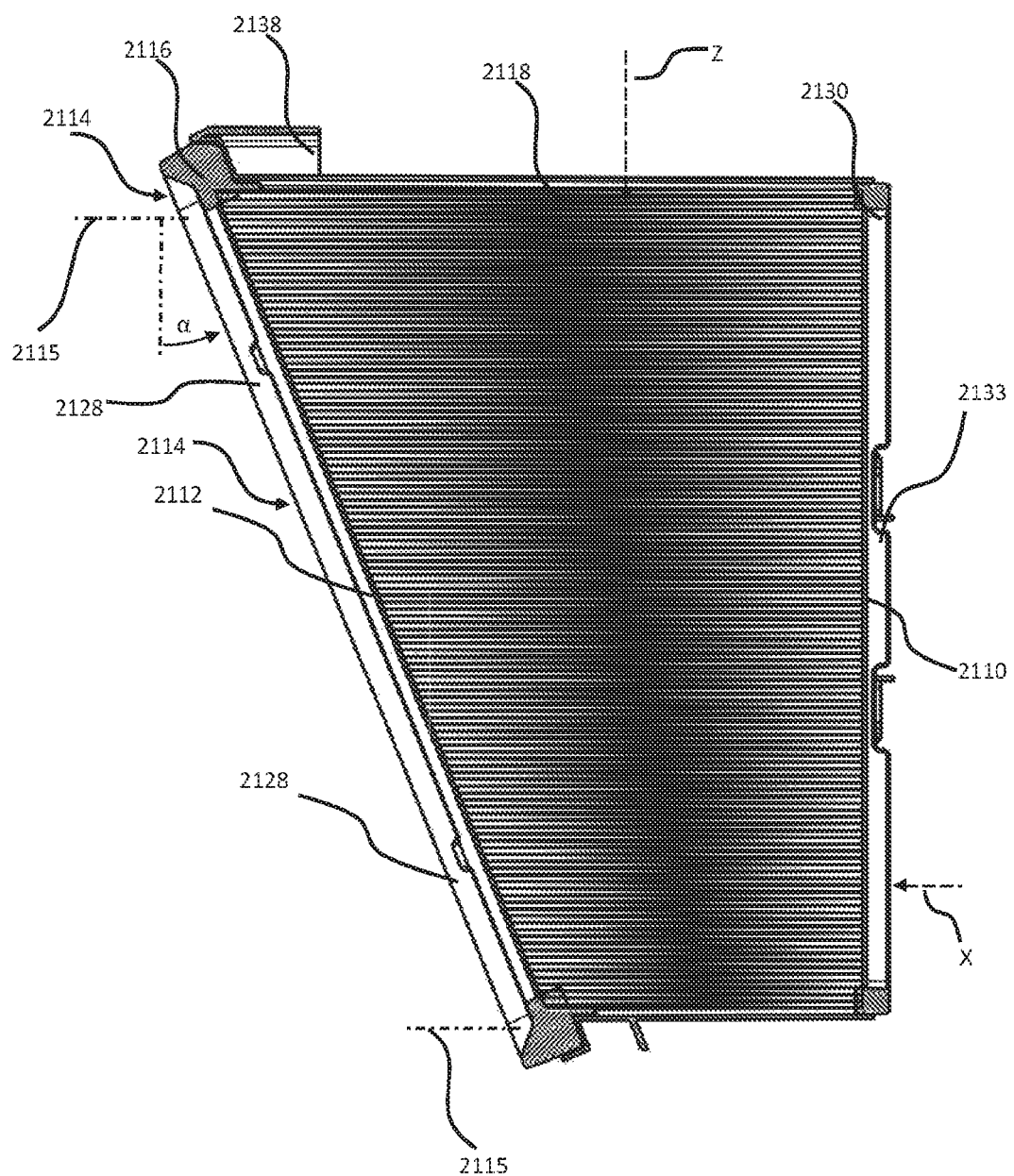
FIG. 13d is a section view of the main filter cartridge of FIG. 11a in a support frame, wherein the section is extending centrally through the main filter cartridge, parallel to the main flow direction X, perpendicular to the inflow surface, and parallel to the installation direction Z.
Figure 15:
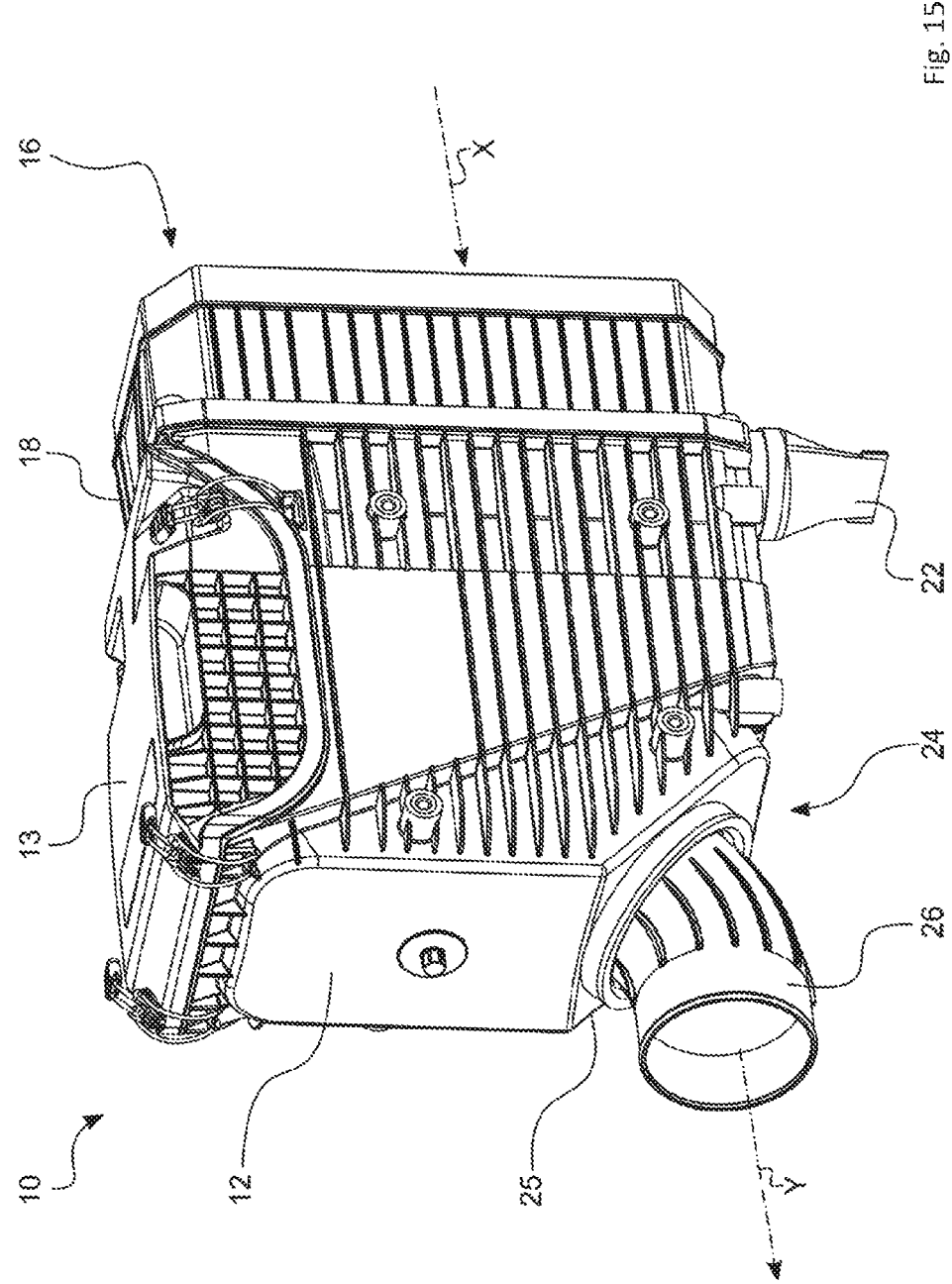
FIG. 15 is perspective external view of the filter of FIG. 5 showing the outlet socket in a first position.
Figure 16:
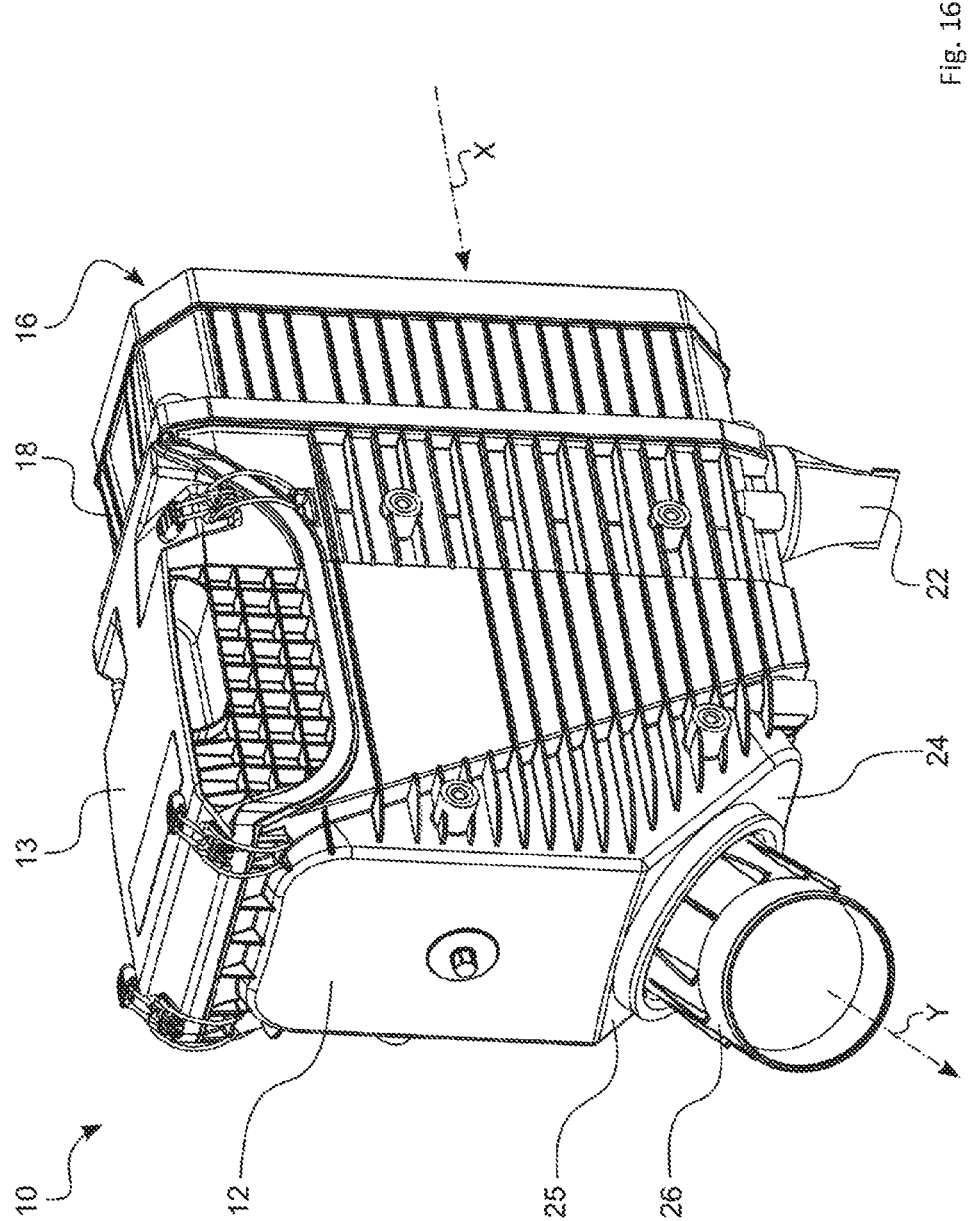
FIG. 16 is perspective external view of the filter of FIG. 5 showing the outlet socket in a second position.
Figure 17:
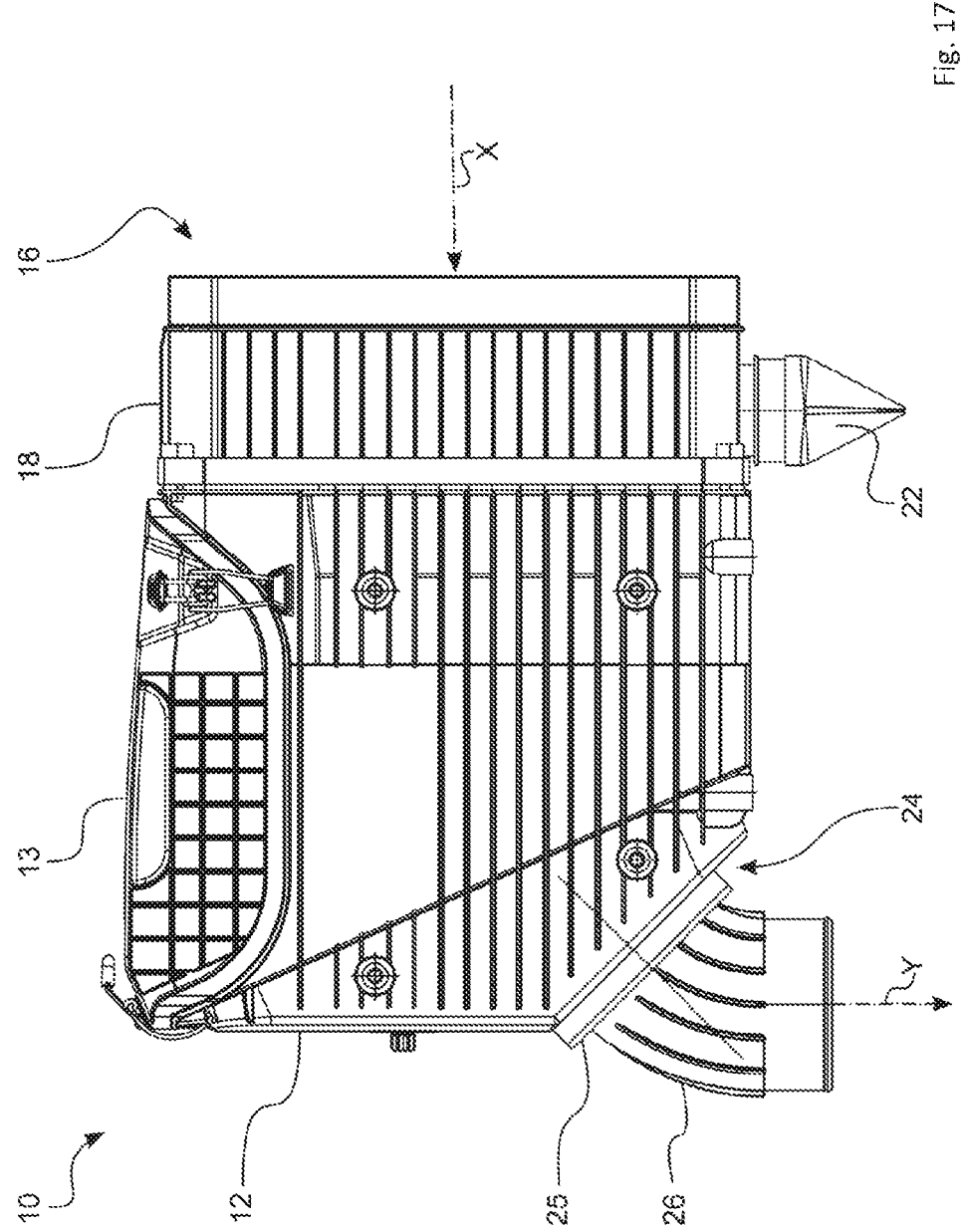
FIG. 17 is a side view of the filter of FIG. 5.
Figure 18:
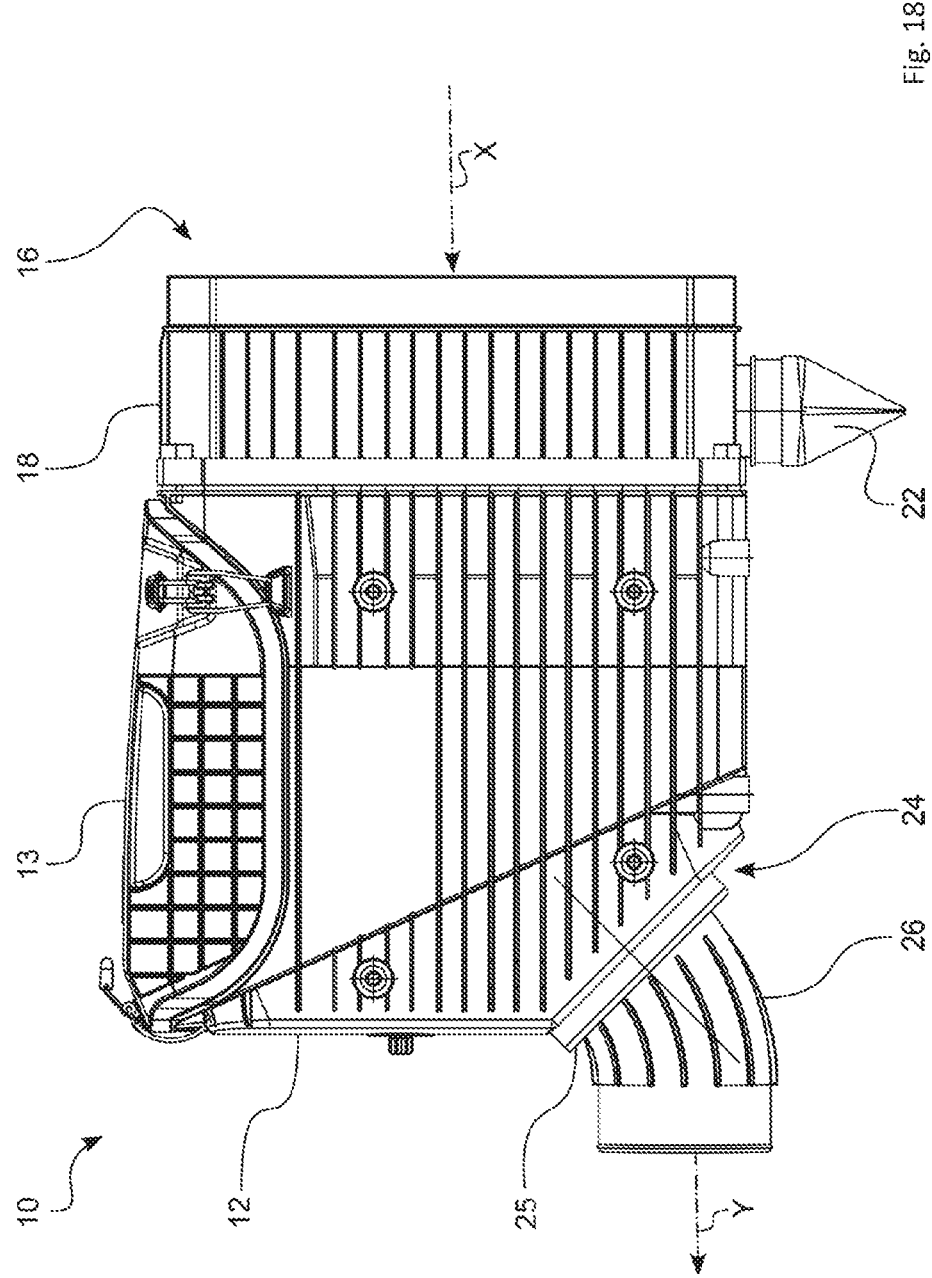
FIG. 18 is a side view of the filter of FIG. 15.
Figure 19:
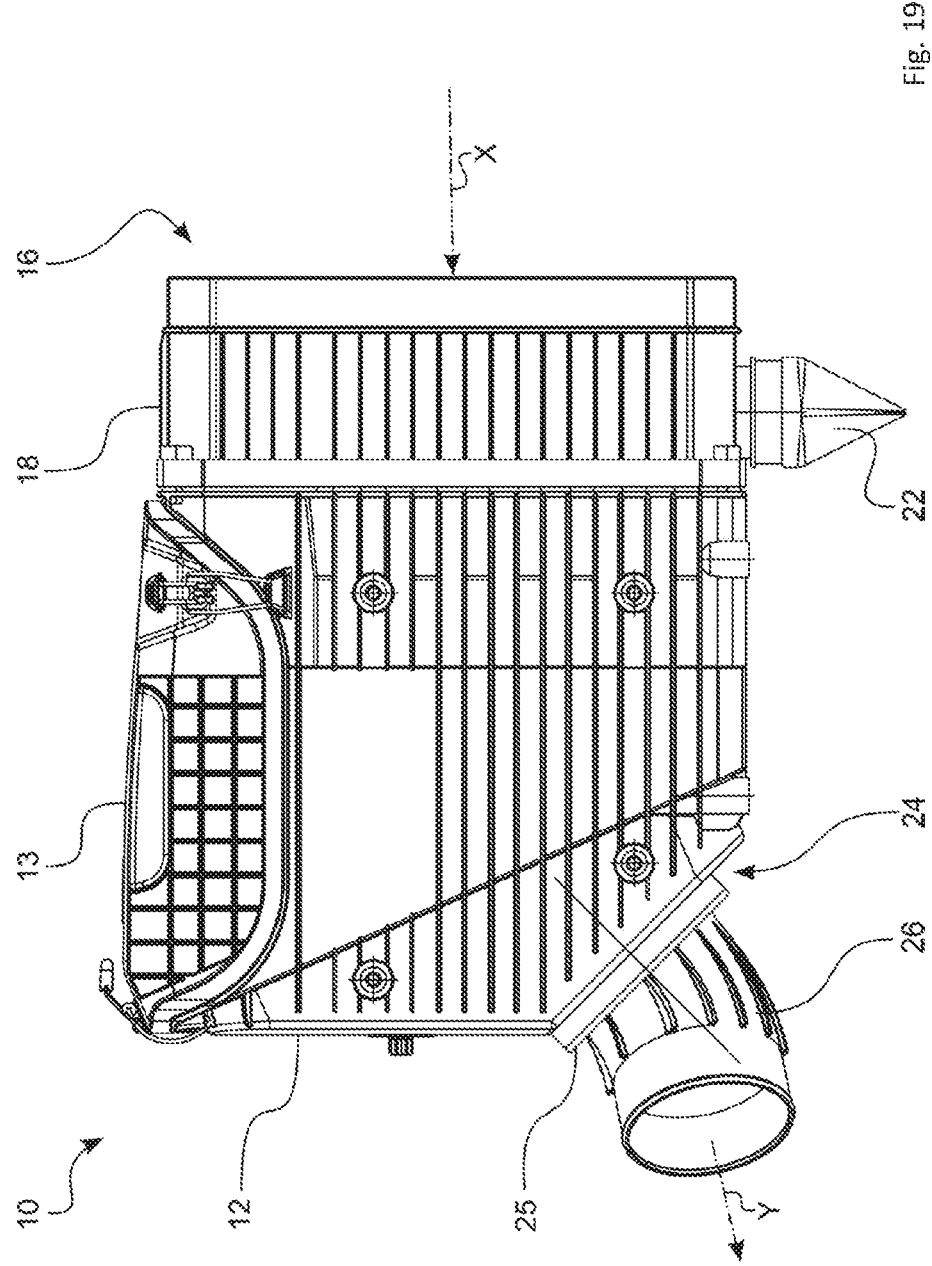
FIG. 19 is a side view of the filter of FIG. 16.

FIGS. 11a, 12a, 12b, and 13a to 13d show a variant 2100 of the main filter cartridge 100 in which the filter cartridge frame 2118 is detachably and reusably connected with the filter cartridge 2100. The outer shape, recognizable as a truncated wedge, corresponds to the shape of the one-part embodiment of FIGS. 11 to 14. The significant difference to the one-part embodiment is that the filter cartridge frame 2118 can be separated from the (main) filter cartridge 2100 and thus is reusable upon exchange of the filter cartridge 2100. The main filter cartridge 2100 comprises an inflow surface 2110 and an outflow surface 2112. Inflow into the main filter cartridge 2100 occurs at inflow surface 2110 and flow through it along the main flow direction X1. The main filter cartridge 2100 comprises a filter cartridge frame 2118 which receives the main filter cartridge 2100. The filter body 2120 is embodied as a folded bellows in the present case. The inflow-side fold edges 2122 are positioned opposite outflow-side fold edges 2124. Inflow-side fold edges 2122 and outflow-side fold edges 2124 are positioned parallel, substantially perpendicular to the main flow direction X1, and substantially horizontally in FIGS. 11a, 12a, 12b, and 13a to 13d. This orientation of the fold edges 2122, 2124 enables a variation of the fold depth in the direction of an insertion direction Z. Along the insertion direction Z, the main filter cartridge 2100, as an alternative to the main filter cartridge 100, is insertable into the filter housing 12 of the filter 10 (see FIGS. 1 through 5) in the same way. In the present embodiment, the fold height decreases also along the insertion direction Z. This effects tilting of the inflow surface 2110 relative to the outflow surface 2112 about angle α (FIG. 13d).

In the area of the outflow surface 2110, the filter cartridge 2100 has a sealing surface 114 which is provided along a circumferential seal 2116. The seal serves for separating the raw-side area 14 from the clean-side area 16 in the filter housing 12 of the filter 10 when the main filter cartridge 2100 is inserted into the filter 10. The seal 2116 substantially comprises in cross-section a pointed shape which ends in the preferred flattened sealing surface 2114 which can be pressed so as to seal axially against a seal contact surface of the filter housing 12. The seal 2116 and the sealing surface 2114 are located outside of, in particular radially outside of, the filter body envelope 2115 which is defined by the base and top faces as well as the second and fourth lateral faces. In this way, it is ensured that even for flow deflection downstream of the main filter cartridge 2100 no impairment of the flow by the seal 2116 occurs.

For reinforcing and better mechanical support of the seal 2116 on the filter frame 2118, a seal holder is provided on the end of the filter cartridge frame 2118 which is facing the seal 2116 and which has preferably an L-shaped cross-section, wherein the first web projects away from the filter cartridge frame 2118 outwardly and provides a seal support surface 2113 extending parallel to the sealing surface 2114 on which the seal 2116 with its support surface 2115 that is opposite the sealing surface 2114 and at least partially surrounds the filter body 2120 can be supported. The seal support surface 2113 represents the first leg of the L-shaped cross-section. Moreover, for configuring the second leg of the L, a second web 2126 is provided which extends away from the filter cartridge frame 2118 and which surrounds the seal 2116 externally. At the same time, the seal 2116 can contact the filter body 2120 or penetrate it so that a fluid-tight sealing between filter body 2120 and the seal 2116 is generated.

Moreover, in analogy to the first embodiment, the seal 2116 also has a spacer structure embodied as support knobs 2128 in the present case. The support knobs 2128 are component of the sealing material of the seal 2116. In analogy to the cross-section view of FIG. 4, the support knobs 2128 also contact the secondary filter cartridge 200, in particular a secondary filter cartridge frame, when the main filter cartridge 2100 and secondary filter cartridge 200 are inserted into the filter housing 12 of the filter 10. In this state, the secondary filter cartridge 200, even in case of vibration excitation that can be transmitted, for example, by the filter housing 12, cannot move out of its seal seat in the filter housing 12. Also, by means of the support knobs 2128 it is ensured that the secondary filter cartridge 200 after the installation of the main filter cartridge 100 and closing of the cover 13 is seated in the correct position within the filter housing 12.

A plurality of support knobs 2128 are positioned along the seal 2116 on the side which is facing the outflow surface 2112. They can be produced, for example, integrally with the seal 2116 when producing the seal 2116.

The seal 2116 is located on the outflow surface 2112 of the main filter cartridge 2100 and acts in a direction that is perpendicular to the outflow surface 2112, i.e., substantially axially along the main flow direction X1 and/or in accordance with the angle position of the outflow surface.

The main filter cartridge 2100 comprises at its inflow side 2110 an edge protection 2130 which is surrounding externally the filter body 2120. The edge protection 2130 is designed such that, when tapping the main filter cartridge 2100, for example, for cleaning, impacts against the filter cartridge 2100 can be absorbed and at least partially compensated. Accordingly, damage of the filter cartridge 2100, for example, of the filter body 2120, can be avoided. The edge protection 2130 extends circumferentially about the inflow side edge of the filter element 2100. In this context, in analogy to the preceding embodiment, individual interruptions, for example, the notches 134 can be provided (not shown here). The notches 134 are produced when manufacturing the edge protection 2130. In this context, the filter body 2120 is positioned in a casting mold. Webs secure in this context the spacing between the casting mold bottom and the filter body 2120 and result in the notches 134 being produced during the casting process.

At the inflow side edge 2132 of the edge protection, at least one cutout 2131 (preferably two, as shown) are provided, respectively, on the longitudinal sides (the edges relative to the base and top face) and engaged in particular by form fit by support webs 2133 of the filter cartridge frame 2118, in particular for stabilization of the filter cartridge frame and/or for positional securing of the filter cartridge 2100. The edge protection 2130 comprises moreover, in particular positioned in the installation direction (Z direction) between the cutouts 2131, on the longitudinal sides a laterally outwardly projecting projection 2135, respectively, which is projecting past the exterior surface of the filter body 2120, in particular the base and top faces. The projections can be guided upon insertion of the filter cartridge 2100 into the filter cartridge frame 2118 in a groove 2137 extending in the insertion direction, i.e., opposite to the flow direction X. The groove 2137 comprises, viewed in the insertion direction, shortly before the inflow-side end, i.e., a few millimeters or centimeters spaced away from the inflow-side edge of the filter cartridge frame, an elevation 2117 that reduces the depth of the groove 2137 and is in particular so high that, in the area of the elevation 2117, the groove 2137 completely or partially vanishes and forms again toward the inflow-side end of the filter cartridge frame in an inflow-side end area 2119. Upon insertion of the filter cartridge 2100 into the filter cartridge frame, this elevation 2117 must be overcome with elastic deformation of the filter cartridge 2100, in particular of the projections 2135, before the projections 2135 come to rest at the inflow-side end area 2119 of the groove 2137. In this way, a detachable form-fit connection of the filter cartridge 2100 with the filter cartridge frame 2118 can be produced.

In analogy to the first embodiment, the filter cartridge frame 2118 has also a grip 2138. The grip 2138 interacts preferably with the cover 13 of the filter 10 and ensures a reliable seat of the main filter cartridge 100 in the filter housing 12 and exerts at the same time a pressure on the seal 116 directed axially in the direction of the main flow direction X1 and ensures in this way the fixed seal seat of the main filter cartridge 100 in the filter housing 12.

However, in both embodiments it is preferred that blades that extend from the cover 13, laterally of the main filter element 2100, 100, into the filter housing 12 and are preferably wedge-shaped, exert a force in the direction of the sealing surface 114, 2114 on the main filter element 2100, 1200 in the closed state. This can be realized preferably in that the blades at their narrow sides each have a support surface. The blades are supported in this context preferably with a first support surface on the filter housing and are resting with a second support surface opposite the first one on a contact surface 2121 of the main filter element 100 or of the support frame 2118 and press thereby the seal 116, 2116 of the main filter element 100, 2100 against the sealing surface of the housing 12. In case of the first embodiment, the force is transmitted in this context by the support frame 118 directly to the seal 116 as a result of the form fit connection. In case of the second embodiment, the support force is transmitted from the blade against the contact surface 2121 and is in this way introduced into the support frame 2118 which, in turn, is supported on the seal support surface 2113 on the seal 2116, in particular its support surface 2115, and in this way introduces the force into the seal 2116 where then the compression of the sealing surface 2114 with the corresponding contact surface of the housing 12 is realized.

The FIGS. 6 to 10 show an embodiment of a secondary filter cartridge 200. The secondary filter cartridge 200 comprises a main inflow surface 210, an outflow surface 212 as well as a main flow direction Y1. Moreover, the secondary filter cartridge 200 comprises a filter body 214 which is supported by a filter cartridge frame 216. At the inflow side, the filter cartridge frame 216 with a frame area 218 circumferentially surrounding the filter body 214 is substantially flush with the filter body 214. The frame area 218 can serve, for example, as an abutment for the support knobs 128 of the main filter cartridge 100 in the inserted state of both filter cartridges 100, 200.

In the present embodiment, the filter body 214 is substantially parallelepipedal, however, other basic shapes like, for example, a prism are conceivable. At the outflow side, i.e., in the area of the outflow surface 212, the filter cartridge frame 216 is provided with a grate structure 220. The grate structure 220 covers the outflow surface 212 at least partially. In case of a high differential pressure between the inflow side 210 and the outflow side 212, the grate structure 220 prevents an undesirable bending or even falling out of the filter body 214.

At a narrow side of the parallelepipedal filter body 214, the filter cartridge frame 216 is provided with a grip depression 222. In order to provide for comfortable gripping in the grip depression 222 by the hand of a person who wants to exchange the secondary filter cartridge 200, the frame area 218 in the area of the grip depression 222 is widened to a grip stay 224. The width of the grip stay 224 is selected such in this context that a direct inflow of a fluid exiting from the main filter cartridge outflow side 112 toward the filter body 214 is possible in particular at the side which is facing the grip depression 222. This is easily apparent in particular also in the cross-sectional view of FIG. 4. Also, from the uppermost edge 113 of the main filter element outflow surface 112, exiting fluid can flow directly to the filter body 214 of the secondary filter cartridge 200. In this context, the fluid can enter in particular through the auxiliary inflow surface 211 into the filter body 214.

In this embodiment, the filter body 214 is designed as a filter bellows. The fold edges extend in this context parallel to the longitudinal axis of the secondary filter cartridge 200 so that the end faces of the folds form the auxiliary inflow surface 211. The fold edges of the folds form the main inflow surface 210 and the outflow surface 212. By the combination of grip depression 222 and filter bellows 214 with inflow laterally via the auxiliary inflow surface 211, the pressure losses at the secondary filter cartridge 200 can be reduced because the secondary filter cartridge 200 is matched significantly better to the flow guidance from the main filter cartridge 100 to the outflow socket in the filter housing 12. At the same time, the grate structure 220 at the outflow side 212 improves collapse resistance of the secondary filter cartridge 200. Moreover, by means of the integrated grip at the grip depression 222, an easy removal of the filter cartridge 200 is possible.

The secondary filter cartridge 200 comprises a filter frame 216 which provides a groove 226 extending circumferentially about the outflow-side rim of the filter body 214. At the same time, a web 228 is provided on the side of the filter cartridge frame 216 which is facing the grip depression 222. The groove 226 serves as a casting mold for a circumferentially extending adhesive connection and sealing action of the filter body 214 with the filter cartridge frame 216. The sealing action and adhesive connection are effected by a sealing material 230 (see FIG. 9). The sealing material 230 can be, for example, a foaming polyurethane. However, also silicone-based material systems are conceivable.

The groove 226 and additionally the web 228 ensure good mechanical coupling of the sealing material 230 on the filter cartridge frame 216. This configuration has moreover the advantage that after introduction of the sealing material 230 into the groove 226 and insertion of the filter body 214 into the filter cartridge frame 216 and a subsequent foaming and hardening, no further processing steps such as, for example, cutting to size of the sealing material 230, are required. Excess material can be absorbed partially by the filter body 214 or can reach the intermediate area between filter body 214 and filter cartridge frame 216 without this being disadvantageous.

The depth of the groove 226 extends substantially along the main flow direction Y1 of the secondary filter cartridge 200. The outflow-side grate structure 222 can be formed as one part together with the filter cartridge frame 216.

At its inflow-side circumference, the filter cartridge frame 216 has a seal receiving groove 232. In this seal receiving groove 232, a seal 234 can be inserted that is, for example, manufactured of cellular rubber. The seal 234 is thus acting radially, i.e., perpendicular to the main flow direction Y1 of the secondary filter cartridge 200. FIGS. 15 to 19 show the filter 10 with different orientations of the outflow socket 26. The filter housing 12 of the filter 10 comprises in the outflow area 24 a fastening area 25. The fastening area 25 is positioned relative to the main inflow direction X of the filter housing 12 at an angle of approximately 45°. An outflow socket 26 can be attached to the fastening area 25. The outflow socket 26 is shaped such that a fluid flowing through the outflow socket 26 is subjected to a deflection of 45°. The outflow socket 46, prior to final attachment on the fastening surface 25, is rotatably attachable. Accordingly, at a very late point in time in the manufacture of the filter 10 the final deflection direction or outflow direction Y of the filter 10 can then be determined. In the geometry shown in this embodiment, an inline flow (FIG. 15, FIG. 18), a deflection by 90° (FIG. 17) as well as intermediate angle ranges are possible. In the angle ranges that are between the extreme angles, an additional a lateral deflection occurs.

The embodiments that have been described above in connection with FIGS. 1 to 19 represent detail embodiments and further developments of the embodiments which are described in the following with the aid of FIGS. 20 to 36 wherein the features which have been added by the further developments are advantageous but not mandatorily required and also can be added individually to an embodiment according to the following illustrated Figures.

With reference to FIGS. 20 to 23, a first embodiment of a filter 1010 according to the invention will be described. The filter can be used in particular in the air intake manifold of construction or agricultural machines, compressors or other devices with internal combustion engines for filtering a fluid, in particular air. The filter 1010 comprises a filter housing 1011 that can be divided roughly into a raw-side area 1012 and a clean side area 1013. In the clean-side area 1012 a main filter element 1020 is insertable into the filter housing 1011. The main filter element 1020 comprises a main filter element inflow surface 1021 as well as a main filter element outflow surface 1022 and is flowed through along the main filter element flow direction X1. The main filter element flow direction X1 coincides in the here described embodiment substantially with the inflow direction X0 of the filter housing 1011. However, also other constellations are conceivable in which the main filter element flow direction X1 and the inflow direction X0 of the filter housing 1010 are positioned at an angle to each other. Upstream of the main filter element 1020, a coarse or pre-separation module is provided that is embodied in the present case as a cyclone block 1040. In the cyclone block 1040, a plurality of individual pre-separation cells 1041 are connected in parallel in a so-called multi-cyclone block. In the cyclone block 1040 the pre-separated dust and/or water is discharged through dust discharge socket 1024 from the housing.

Downstream of the main filter element 1020 a secondary filter element 1030 is arranged. The secondary element inflow surface 1031 of the secondary filter element 1030 is facing the main filter element outflow surface 1022, the outflow surface 1032 of the secondary filter element 1030 is oriented in the direction of an outflow opening 1017 of the filter housing 1011. The secondary filter element 1030 is arranged in the area 1013 of the filter housing 1011 which, relative to the main filter element 1020, is a clean side and provides protection from penetration of contaminants into the intake system downstream of the filter, in particular in case of exchange of the main filter element 1020.

The main filter element 1020, shown in FIG. 24 as a separate component, comprises at its outflow surface 1022 a sealing surface 1026 on which a seal 1024 for fluid-tight separation of the raw-side area 1012 and the clean side area 1013 of the filter housing 1011 is provided. The sealing surface 1026 is positioned at a slant to the main flow direction X1 of the main filter element 1020. The selected angle α is 60° in this embodiment. The angle value represents only an exemplary embodiment. According to the invention, the angle α can be varied between 10 and 80°. Particularly preferred, the angle range is between 70 and 30°.

The seal 1024 of the sealing surface 1026 is resting against an appropriate housing structure 1028 and is forced by a cover 1040 of the housing 1011 against the seal seat which is formed by the housing structure 1028. The cover 1014 that closes off the housing can be removed perpendicularly to the main flow direction X1 of the main filter element 1020 from the housing and has a blade-shaped pressing structure 1050, 1051 arranged in pairs on the cover 1014. It is matched in its shape to the slant of the sealing surface 1026 and, in the closed state, exerts a force on the main filter element 1020 which is substantially perpendicular to the main flow direction X1. Due to the slanted position of the sealing surface 1026, the force which is extending perpendicular to the main flow direction X1 is deflected at least partially into a force that is extending in the main flow direction X1 and leads thus to a reliable compression of the main filter element 1020 with the housing 1011. In particular, in this way an axial pressing force, i.e., extending in the main flow direction X1, is generated that provides a particularly great sealing effect. At the same time, a particularly good contact of the seal 1026 at the corresponding housing structure is achieved because upon compression by the housing cover the seal glides somewhat and in this way unevenness is molded well into the sealing compound.

The main filter element 1020 may comprise a folded bellows as a basic construction. For obtaining the desired sealing surface slant, the fold height or fold depth along a direction perpendicular to the main flow axis X1 can be reduced stepwise. With such a configuration, the fold edges are the inflow side. The end faces of the folds must be glued at least partially for such a configuration, either across the entire surface area or every other end face, so that raw side and clean side remain separated. In the section illustration of FIG. 23, in the described embodiment the fold edges extend perpendicular to the drawing plane, the end face of the folds is positioned in the drawing plane. This means that the main flow direction X1 extends parallel to the planes that are formed by the end faces of the fold edges and perpendicular to the each fold edge.

Alternatively, in a folded bellows according to the invention, the orientation of the individual folds can also be such that the end face of the folds is extending substantially perpendicular to the drawing plane of FIG. 23, i.e., the cover 1014 extends parallel to the end face of the folds of the main filter element 1020. The main filter element inflow surface 1021 is then formed by fold edges that are extending perpendicular to the main flow direction X1. The fold edges extend in FIG. 20 perpendicular from top to bottom. The main filter element outflow surface 1022 is also formed by fold edges which extend along the slant according to the angle α. For such a folding, the fold height varies over the course of the fold edge.

FIGS. 24 and 25 represent the main filter element 1020 as a removed element. The FIGS. 26 and 27 illustrate the aforementioned alternative folding types as schematics. In the schematics, an end face of the folds is identified with reference numeral 1023 and a fold edge with the reference numeral 1025, respectively.

The secondary element 1030 which is illustrated in FIGS. 28 and 29 as a removed element can be designed as a straight folded flat elements in the present embodiment.

With reference to FIGS. 23, 30, and 31, the filter 1010 will now be described with regard to the outflow situation in more detail. The filter housing 1011 comprises in the clean-side area 1013 an outflow area 1015. The outflow area 1015 is provided with the fastening surface 1016. The fastening surface 1016 is positioned relative to the inflow direction X0 of the filter housing as well as relative to the main flow direction X1 of the main filter element 1020 at an angle of 45°. An outflow socket 1018 is fastened to the fastening surface 1016. The geometry of the outflow socket 1018 is selected such that the fastening area 1019 provided for attachment on the fastening surface 1016 is also slantedly positioned by 45° relative to the outflow direction determined by the outflow socket 1018. Also, the fastening area 1019 of the outflow socket 1018 is designed to be of rotational symmetry, i.e., it forms a circular disk in which a penetration for the outflow opening 1017 of the housing 1011 is provided. As a result of the rotational symmetry, the outflow socket 1018 can be rotated prior to final attachment of the fastening area 1019 on the fastening surface 1016 of the outflow area 1015 and, in this way, the outflow direction Y0 of the filter housing 1011 can be determined. Depending on the orientation of the outflow socket 1018, the angle between the inflow direction X0 and the outflow direction Y0 can be varied between 0° (inline flow) and 90° (right angle outflow). In FIGS. 20 and 23 a deflection of the inflow direction X0 by 90° to the outflow direction Y0 is shown. In FIG. 30, an inline flow direction is shown, i.e., the inflow direction X0 and the outflow direction Y0 are parallel to each other. FIG. 31 shows an intermediate angle of approximately 45° between inflow direction X0 and outflow direction Y0.

In FIGS. 32 to 36, an alternative embodiment of the filter 1010 with regard to the fastening surface 1016 of the outflow area 1015 is shown. In FIG. 36, additionally the geometry of main filter element and secondary filter element is changed in this alternative embodiment.

In FIGS. 32 to 35, the filter element 1010 is however changed such that a fastening surface 1116 is provided which is located on a lateral cylinder surface. The axis of such a lateral cylinder surface is positioned perpendicular to the drawing plane, i.e., also perpendicular to the main flow direction X1 of the main filter element 1020. In accordance with the fastening surface 1116 which, viewed from the exterior, is convex, an outflow socket 1118 is provided which has a corresponding concavely shaped fastening area 1119. Depending on the fastening location of the outflow socket 1118 on the convex fastening surface 1116, the outflow direction Y0 of the filter housing 1011 can be varied.

FIG. 36 shows an embodiment in which the filter housing 1011 is substantially comparable to the embodiment of FIGS. 32 to 35 but the filter element geometry is changed. For avoiding repetitions, the description of features which have been identified in the Figures with same reference characters is omitted.

The filter 1110 of FIG. 36 comprises a main filter element 1120 that has a substantially planar inflow surface 1121 and an outflow surface 1122 that is convexly shaped when viewed from the exterior of the filter element. The outflow surface 1122 in the present invention is substantially a lateral cylinder surface but can also be provided, depending on the application situation, with other curvatures, also with non-uniform curvatures. In accordance with the curvature of the outflow surface 1122, a secondary element 1130 is provided that comprises an also curved inflow surface 1131 and a curved outflow surface 1132. The secondary filter element 1130 can have two differently curved inflow and outflow surfaces. In the present embodiment, the outflow surface 1132 is matched to the curvature of the fastening area 1116. This embodiment represents an embodiment that is particularly optimized with regard to installation space.

The attachment of the outflow socket 1018, 1118 can be realized, for example, by fusing. Depending on the application situation, the outflow opening 1017 in the outflow area 1015 can be introduced prior to attachment of the outflow socket 1016, 1116 in a flexible way, for example, by stamping.

The secondary filter element 1130 can be realized, for example, as a curved flat bellows. In manufacture, a conventional flat element could be used that during assembly is then introduced into a correspondingly curved plastic frame and shaped.

In each of the illustrated variants, the secondary filter element can comprise an integrated grip for removal of the secondary filter element.

What is claimed is:

1. A filter cartridge for a filter for filtration of a fluid, the filter cartridge comprising:
   a prismatic basic shape comprising a base face and a top face arranged parallel to each other and each having a polygonal basic shape;
   the prismatic basic shape further comprising
      a first lateral face and
      a second lateral face neighboring the first lateral face, wherein the first lateral face is an inflow surface and is substantially positioned perpendicular to the neighboring second lateral face;
   the prismatic basic shape further comprising
      a third lateral face that is an outflow surface and is positioned at an angle relative to the first lateral face, wherein the angle is greater than 10° and smaller than 80°;
   wherein the polygonal basic shape is a quadrangle and comprises
      a fourth lateral face positioned parallel to and opposite the second lateral face;
   the filter cartridge further comprising:
      a filter cartridge frame;
      a seal arranged in the area of the outflow surface and configured to separate a filter interior into a clean side and a raw side, the seal having a sealing surface extending parallel to the outflow surface; and
      a spacer structure configured to determine a spacing between the filter cartridge frame and a further downstream filter cartridge;
   wherein the filter cartridge frame has a contact surface configured and adapted to support a support surface of a blade projecting from a housing cover, the contact surface being parallel to the sealing surface.

2. The filter cartridge according to claim 1, wherein the seal is an axially acting seal, the sealing surface facing in a direction away from the outflow surface, the contact surface facing in the opposite direction.

3. The filter cartridge according to claim 1, further comprising
   a zigzag-shaped folded filter medium comprising folds.

4. The filter cartridge according to claim 3, wherein the folds comprise outer fold edges, positioned on the first lateral face,
   and further comprise inner fold edges,
   wherein the inner fold edges are positioned opposite the outer fold edges and are positioned on the third lateral face.

5. The filter cartridge according to claim 3, wherein the folds each have a depth and the depth of the folds differs among the folds that are neighboring each other.

6. The filter cartridge according to claim 3, wherein the depth of the folds at the second lateral face is different from the depth of the folds at the fourth lateral face.

7. The filter cartridge according to claim 3, wherein the depth of the folds changes continuously from the second lateral face toward the fourth lateral face.

8. The filter cartridge according to claim 3, wherein the folds comprise a first end face and a second end face, wherein the first end face of the folds is positioned on the base face and
   the second end face of the folds is positioned on the top face.

9. The filter cartridge according to claim 1, wherein the spacer structure is formed integrally with the seal.

10. A filter comprising a filter cartridge according to claim 1, wherein
    a main inflow direction of the filter and a main outflow direction of the filter are positioned at an angle of more than 30° relative to each other.

11. The filter according to claim 1, wherein
    a main inflow direction of the filter is parallel and displaced relative to a main outflow direction of the filter.

12. A filter comprising
    a main filter cartridge and
    a secondary filter cartridge,
    wherein at least one of the main filter cartridge and of the secondary filter cartridge is embodied according to claim 1.

13. A filter cartridge for a filter for filtration of a fluid, the filter cartridge comprising:
    a prismatic basic shape comprising a base face and a top face arranged parallel to each other and each having a polygonal basic shape;
    the prismatic basic shape further comprising
       a first lateral face and
       a second lateral face neighboring the first lateral face, wherein the first lateral face is an inflow surface and is substantially positioned perpendicular to the neighboring second lateral face;
    the prismatic basic shape further comprising
       a third lateral face that is an outflow surface and is positioned at an angle relative to the first lateral face, wherein the angle is greater than 10° and smaller than 80°;
    wherein the polygonal basic shape is a quadrangle and comprises
       a fourth lateral face positioned parallel to and opposite the second lateral face:
    the filter cartridge further comprising:
       a filter cartridge frame;
       a seal arranged in the area of the outflow surface and configured to separate a filter interior into a clean side and a raw side, the seal having a sealing surface extending parallel to the outflow surface;
    wherein the filter cartridge frame has a contact surface configured and adapted to support a support surface of a blade projecting from a housing cover, the contact surface being parallel to the sealing surface;
    wherein the filter cartridge further comprises:
       a filter body;
       a filter cartridge frame supporting the filter body;
       an edge protection disposed on the filter cartridge frame in the area of the inflow surface and circumferentially surrounding externally the filter body,
       wherein the edge protection connects the filter body and the filter cartridge frame detachably or non-detachably to each other.

14. A filter comprising:
    a filter housing comprising a raw-side area and a clean-side area;

a main filter cartridge for a filter for filtration of a fluid, the main filter cartridge comprising:
  a prismatic basic shape comprising a base face and a top face arranged parallel to each other and each having a polygonal basic shape;
  the prismatic basic shape further comprising
    a first lateral face and
    a second lateral face neighboring the first lateral face, wherein the first lateral face is a main filter cartridge inflow surface and is substantially positioned perpendicular to the neighboring second lateral face;
  the prismatic basic shape further comprising
    a third lateral face that is a main filter cartridge outflow surface and is positioned at an angle relative to the first lateral face,
      wherein the angle is greater than 10° and smaller than 80°;
    wherein the polygonal basic shape is a quadrangle and comprises
      a fourth lateral face positioned parallel to and opposite the second lateral face;
  the main filter cartridge further comprising:
    a filter cartridge frame;
    a seal arranged in the area of the main filter cartridge outflow surface and configured to separate a filter interior into a clean side and a raw side, the seal having a sealing surface extending parallel to the outflow surface;
  wherein the filter cartridge frame has a contact surface configured and adapted to support a support surface of a blade projecting from a housing cover, the contact surface being parallel to the sealing surface;
    wherein the main filter cartridge is configured to be disposed in the filter housing,
    wherein the main filter cartridge comprises
      a main filter cartridge flow direction from the main filter cartridge inflow surface to the main filter cartridge outflow surface, and
      a seal arranged on a sealing surface of the main filter cartridge and configured to fluid-tightly separate the raw-side area and the clean-side area of the filter housing from each other when the main filter cartridge is arranged in the filter housing;
  a secondary filter cartridge arranged downstream of the main filter cartridge in the main filter cartridge flow direction, wherein
    the secondary filter cartridge comprises
      a secondary filter cartridge inflow surface,
      a secondary filter cartridge outflow surface, and
      a secondary filter cartridge flow direction from the secondary filter cartridge inflow surface to the secondary filter cartridge outflow surface;
  wherein the sealing surface is arranged at a slant relative to the main filter cartridge flow direction of the main filter cartridge.

15. The filter according to claim 14, wherein
the sealing surface and the main filter cartridge flow direction are positioned at an angle relative to each other that is between 80° and 10°.

16. The filter according to claim 14, wherein
the sealing surface and the main filter cartridge outflow surface extend parallel to each other.

17. The filter according to claim 14, wherein
the secondary filter cartridge inflow surface extends parallel and spaced apart at a spacing relative to the sealing surface.

18. The filter according to claim 17, wherein
the spacing of the secondary filter cartridge inflow surface relative to the sealing surface is less than 2 cm.

19. The filter according to claim 14, wherein
the secondary filter cartridge has a basic shape of a parallelepiped.

20. The filter according to claim 14, wherein
the main filter cartridge has a basic shape of a prism with a base face shaped as a quadrangle and a top face shaped as a quadrangle.

21. The filter according to claim 14, wherein
the main filter element comprises a folded bellows with at least two different fold depths.

22. The filter according to claim 14, wherein
the filter housing comprises
  an inflow direction,
  an outflow direction,
  an outflow area with an outflow opening, and
  an outflow socket configured to be attached to the outflow area,
wherein the outflow area comprises
  a fastening surface for the outflow socket, and
  wherein the fastening surface is positioned at an angle of 45° relative to the main filter cartridge flow direction.

23. The filter according to claim 22, wherein
the outflow socket is formed such that a deflection of a flow direction by 45° results.

24. The filter according to claim 22, wherein
the outflow socket is embodied with rotational symmetry and comprises
  a fastening area configured to be attached to the filter housing.

25. The filter according to claim 22, wherein
the outflow direction of the filter housing and the fastening surface of the outflow area are positioned at an angle of 45° relative to each other.

26. The filter according to claim 22, wherein
the fastening surface of the outflow area and the secondary filter cartridge outflow surface extend parallel to each other.

27. The filter according to claim 14, wherein
the main filter cartridge is insertable and removable into and from the filter housing along an insertion axis,
wherein the insertion axis is positioned relative to the main filter cartridge flow direction at an angle that is between a 90° angle and the angle at which the sealing surface of the main filter cartridge and the main filter cartridge flow direction are positioned relative to each other,
wherein the filter housing comprises
  a cover that is designed such that, in the state in which the cover closes off the filter housing, the cover exerts a force on the main filter cartridge in the direction toward the sealing surface.

28. The filter according to claim 15, wherein
the filter housing comprises
  a housing cover, the cover comprising
    two wedge shaped blades that project from the cover, laterally relative to the main filter element, into the filter housing, the blades having support surfaces on their narrow sides, respectively.

29. The filter according to claim 28, wherein
the blades each comprise first and second, opposite support surfaces.

30. The filter according to claim 29, wherein the support surfaces of the blades are positioned relative to each other at an angle which corresponds to the angle between inflow surface and outflow or sealing surface.

* * * * *